(12) United States Patent
Klein et al.

(10) Patent No.: US 9,594,366 B2
(45) Date of Patent: Mar. 14, 2017

(54) SYSTEM AND METHOD FOR AN IMPROVED SPRINKLER CONTROL SYSTEM

(71) Applicant: Rachio, Inc., Denver, CO (US)

(72) Inventors: Christopher Michael Klein, Denver, CO (US); Franz David Garsombke, Golden, CO (US); Matthew B. Reisman, South Weymouth, MA (US)

(73) Assignee: RACHIO, INC., Denver, CO (US)

( * ) Notice: Subject to any disclaimer, the term of this patent is extended or adjusted under 35 U.S.C. 154(b) by 484 days.

(21) Appl. No.: 14/271,225

(22) Filed: May 6, 2014

(65) Prior Publication Data

US 2015/0319941 A1    Nov. 12, 2015

(51) Int. Cl.
*A01G 25/16* (2006.01)
*G05B 19/042* (2006.01)
*G05B 15/02* (2006.01)

(52) U.S. Cl.
CPC ....... *G05B 19/0426* (2013.01); *A01G 25/162* (2013.01); *A01G 25/165* (2013.01); *G05B 15/02* (2013.01); *G05B 2219/23435* (2013.01); *G05B 2219/2625* (2013.01)

(58) Field of Classification Search
None
See application file for complete search history.

(56) References Cited

U.S. PATENT DOCUMENTS

| | | | |
|---|---|---|---|
| 5,870,302 A | 2/1999 | Oliver | |
| 6,298,285 B1 * | 10/2001 | Addink | A01G 25/16 239/63 |
| 7,123,993 B1 * | 10/2006 | Freeman | A01G 25/16 239/63 |
| 7,574,284 B2 * | 8/2009 | Goldberg | A01G 25/167 137/78.2 |
| 7,877,168 B1 * | 1/2011 | Porter | A01G 25/167 239/63 |
| 7,883,027 B2 | 2/2011 | Fekete | |
| 8,024,075 B2 | 9/2011 | Fekete | |
| 8,700,222 B1 * | 4/2014 | Woytowitz | A01G 25/16 700/19 |
| 9,043,036 B2 | 5/2015 | Fekete | |
| 2002/0014539 A1 * | 2/2002 | Pagano | A01G 25/167 239/1 |
| 2004/0011880 A1 * | 1/2004 | Addink | A01G 25/16 239/1 |
| 2004/0181315 A1 * | 9/2004 | Cardinal | A01G 25/167 700/284 |
| 2004/0244833 A1 * | 12/2004 | Buhler | A01G 25/167 137/78.2 |

(Continued)

FOREIGN PATENT DOCUMENTS

| | | |
|---|---|---|
| GB | 2492954 A | 1/2013 |
| WO | 2005002321 A2 | 1/2015 |

*Primary Examiner* — Isaac T Tecklu
(74) *Attorney, Agent, or Firm* — Dorsey & Whitney LLP

(57) ABSTRACT

Disclosed embodiments can provide a system and method for controlling irrigation schedules for a sprinkler system including automatically updating irrigation schedules based on qualitative and quantitative feedback and meteorological data as well as matching optimal or near-optimal irrigation schedules to other sprinkler zones based on characteristics of the landscape and sprinkler system as well as other characteristics.

18 Claims, 24 Drawing Sheets

(56) References Cited

U.S. PATENT DOCUMENTS

| | | | |
|---|---|---|---|
| 2006/0116792 A1* | 6/2006 | Addink | A01G 25/16 700/284 |
| 2006/0161309 A1* | 7/2006 | Moore | A01G 25/16 700/284 |
| 2007/0282486 A1* | 12/2007 | Walker | A01G 25/16 700/284 |
| 2008/0125917 A1* | 5/2008 | Walker | A01G 25/16 700/284 |
| 2008/0288116 A1* | 11/2008 | Nickerson | A01G 25/16 700/284 |
| 2009/0319934 A1* | 12/2009 | Hunts | A01G 25/167 715/772 |
| 2011/0049260 A1* | 3/2011 | Palmer | A01G 25/16 239/63 |
| 2011/0106320 A1* | 5/2011 | Hall | A01G 25/16 700/284 |
| 2012/0041606 A1* | 2/2012 | Standerfer | A01G 25/16 700/284 |
| 2012/0095604 A1 | 4/2012 | Alexanian | |
| 2012/0303168 A1* | 11/2012 | Halahan | A01G 25/165 700/284 |
| 2013/0035774 A1* | 2/2013 | Warren | A01G 25/167 700/90 |
| 2013/0085619 A1* | 4/2013 | Howard | G05D 7/0623 700/284 |
| 2014/0148959 A1* | 5/2014 | Levine | A01G 25/16 700/284 |
| 2015/0230417 A1* | 8/2015 | Nickerson | G05B 15/02 700/284 |
| 2016/0100533 A1* | 4/2016 | Bauman | G05B 15/02 700/284 |

* cited by examiner

SYSTEM AND METHOD FOR AN IMPROVED SPRINKLER CONTROL SYSTEM

FIELD

Disclosed embodiments relate to a landscaping sprinkler system control system and a landscaping sprinkler system control method.

BACKGROUND

Current sprinkler systems have their irrigation schedules set manually at the beginning of a watering season and are not adjusted according to the weather. Worse, homeowners typically lack the knowledge about their landscaping or sprinkler system to understand the optimal irrigation schedule. The result is either an over-watered lawn with much water wasted as runoff, an under-watered lawn, or both depending on the sprinkler zone or location with the sprinkler zone.

Additionally, most current sprinkler systems lack the flexibility to handle any type of eccentric irrigation schedule. For example, the typical sprinkler system controller cannot handle more than a couple of irrigation schedules for a zone. And adjusting the schedule both is time consuming and results in shifting from either an under-watered lawn to an over-watered lawn or vice versa.

Current automated sprinkler systems have attempted to bring some efficiency to this process by including sensors that keep track local weather conditions. But, those devices still must be adjusted and require expensive equipment for tracking rain, wind, and humidity. The hardware included in those sprinkler systems can break or malfunction easily because of their exposure. Further, the sensors must be expertly placed to be effective. Even then, those systems can provide only meteorological input into determining any irrigation schedule adjustments and over-watering or under-watering can still result. Sensors can give readings that do not necessarily result in optimal irrigation and this problem is exacerbated when sensors are misplaced, even slightly.

Other automated sprinkler systems take into account historic and predicted weather data to adjust irrigation schedules. Such systems cannot accurately adjust irrigation cycles given that weather forecasts are often wrong or do not accurately reflect weather at the particular site. As a result, these systems can adjust irrigation cycles to the detriment of the landscape health. To compensate, these systems also often rely on sensors and, thus, suffer the same problems described above.

Yet other systems adjust irrigation schedules according to evapotranspiration (ET) information. Again, these systems require the use of sensors susceptible to malfunctioning and expensive controllers to be effective and, again, suffer the same as the systems described above. One example of one automated sprinkler system is described in U.S. Pat. No. 5,870,302 ("Oliver"). In particular, Oliver and similar systems use ET and predicted precipitation data to control an irrigation system. Although these systems address problems associated with depleted moisture levels by detecting moisture levels directly or using other, external data to guess whether moisture levels are depleted and then adjusting an irrigation schedule, they are still closed loop systems that adjust irrigation schedules based solely on empirical sensor data, or systems reliant on historical or forecast weather data.

In the former type of system, they obtain empirical information but require the same costly equipment to obtain it. Moreover, the empirical information they gather cannot truly indicate landscape health. The latter type of system can be implemented more cheaply, both in the long and the short term, but it lacks empirical information and, as a result, can be no more successful at gauging optimal irrigation cycle times and schedules.

Oliver in particular discusses basing an ET value on baseline conditions and then adjusting the irrigation schedules based on predicted and historical weather data. However, here Oliver lacks any ability to determine whether the baseline ET value was correct or continues to provide an accurate baseline. In particular, Oliver bases the ET value only on geographical information and objective data. Thus, Oliver is useful only to the extent a baseline irrigation schedule or ET value is correct and that an adjusted ET value is calculated properly and accurately reflects the landscape. Even then, unless the system employs sensor equipment the actual ET values that Oliver uses to determine when to run a watering cycle, Oliver has only forecasted and historic weather data to rely on. That weather data alone, obtained from a weather service, not sensor equipment at the site, cannot reliably indicate actual precipitation, wind, humidity, etc. at a particular site. As a result, under-watering or over-watering can still be an ongoing concern. Indeed, Oliver and other similar systems can run an irrigation cycle during a precipitation event where a weather forecast is inaccurate. Although Oliver and other similar systems can achieve savings in the short term, they cannot provide long-term flexibility as the irrigated landscape changes over time. Moreover, in many cases, they savings fall short where predicted weather is inaccurate, where sensor data is flawed, or where sensors fail. In the end, Oliver either requires the same costly and wear-prone equipment of a closed loop system or suffers similar problems that conventional sprinkler systems suffer.

Although present devices are functional, they are not sufficiently functional or otherwise satisfactory. Accordingly, a system and method are needed to address the shortfalls of present technology and to provide other new and innovative features.

SUMMARY

Exemplary embodiments are shown in the drawings and are summarized below. These and other embodiments are more fully described in the Detailed Description section. It is to be understood, however, that there is no intention to be limited to the forms described in this Summary of the Invention or in the Detailed Description. One skilled in the art can recognize that there are numerous modifications, equivalents and alternative constructions that fall within the spirit and scope of the inventions as expressed in the claims.

Disclosed embodiments can provide a system and method for controlling irrigation schedules for a sprinkler system including receiving at least one characteristic record value for a first sprinkler zone associated with a first sprinkler controller and a first irrigation schedule, the first irrigation schedule associated with the first sprinkler zone; receiving a computer-readable file including instructions for programming an irrigation schedule for the first sprinkler zone; receiving at least one characteristic record value for a second sprinkler zone associated with a second sprinkler controller and a second irrigation schedule, the second sprinkler controller unrelated to the first sprinkler controller and the second irrigation schedule associated with the second sprinkler zone; determining that a characteristic record value for the first sprinkler zone matches the a characteristic record value for the second sprinkler zone; generating a computer-readable file in a memory of computer server, the file including instructions for programming an irrigation schedule for the second sprinkler zone in response to the determining that a characteristic record associated with the first sprinkler zone matches a characteristic record associated with the second sprinkler zone, the second irrigation schedule based at least in part on the first irrigation schedule; sending, by a network communication device of the computer server, the second irrigation scheduling data for the second sprinkler zone to the second sprinkler controller.

Disclosed embodiments can provide significant water savings by taking into account specific characteristics of a watering zone when creating an irrigation schedule. Further, a more healthy landscape can be provided over current automated sprinkler systems by providing both qualitative and quantitative feedback about the effectiveness of current irrigation schedules and then automatically update irrigation schedules based on that feedback as well as other quantitative information. Additionally, disclosed embodiments can provide a far more convenient method of managing irrigation schedules without specialized knowledge about the functionality of a sprinkler controller or even physical access to a sprinkler controller. Other benefits are disclosed in or are apparent from the description below.

As previously stated, the above-described embodiments and implementations are for illustration purposes only. Numerous other embodiments, implementations, and details are easily recognized by those of skill in the art from the following descriptions and claims.

DETAILED DESCRIPTION

Figure 1:
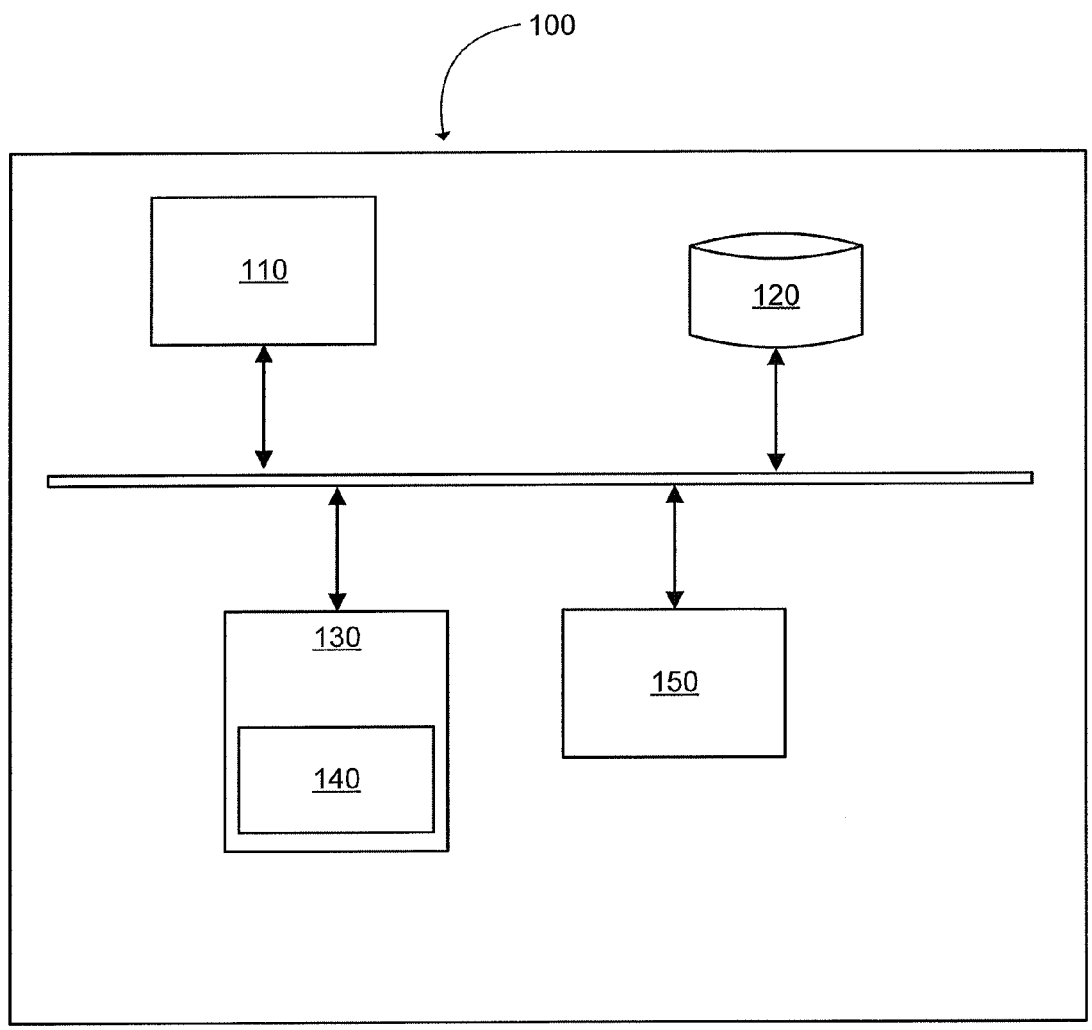
FIG. 1 illustrates a schematic block diagram of a specially-programmed computer that can implement one or more computer system components in accordance with some embodiments.

In some embodiments, a central controller is operatively coupled to one or more sprinkler controllers, user interface devices, and external data sources. Central controller can receive a signal to register a sprinkler controller; can generate and send irrigation schedule data in response to the registration signal; can generate irrigation schedule data based on numerous criteria including the geographic location of the sprinkler controller and the sprinkler zone(s) which it controls, sprinkler characteristics, landscape characteristics, and the like.

Sprinkler characteristics can include characteristics related to sprinkler valves (including make, model, and type), sprinkler heads or nozzles (including make, model, and type), number of sprinkler heads, water pressure, water flow, other characteristics related to the electrical and mechanical sprinkler system, and the like. Landscape characteristics can include characteristics related to turf type, soil type, vegetation type (e.g., whether a zone is all lawn, whether zone includes trees, bushes, flowers, etc., whether zone is a garden, etc.) and the like. These and other criteria are discussed further below. This information can be received by the central controller as part of the registration signal, separately requested by the central controller from the sprinkler controller, or separately received from another device via a registration process. The central controller can generate irrigation schedule data on data from other sprinkler controllers or data related to other sprinkler controllers.

In some embodiments, The central controller can also receive irrigation schedule overrides and change instructions with which it generates either changes to irrigation schedule data or one-time event instructions to send to a sprinkler controller. Accordingly, the central controller can replace or augment an interface of a sprinkler controller and can adjust sprinkler activity without manual intervention.

In some embodiments, the central controller can also receive qualitative and quantitative information associated with a zone and the zone's landscape condition. Further, the central controller can generate irrigation schedule data according to the qualitative and/or quantitative information, for the sprinkler controller for the landscape, another sprinkler controller, or both. In this way, scheduling data can be optimized for a landscape owner.

Qualitative information can include a scaled value that indicates whether the zone is under-watered or over-watered, healthy or unhealthy, or whether the zone is in some other qualitative state. The value can indicate the degree to which the zone is in that qualitative state. For example, number values along a scale (e.g., 1 to 10 or some other scale) can be assigned to indicate how under-watered or over-watered or both (i.e., low number on the scale=under-watered and high number on the scale=over-watered). Quantitative information can include Quantitative data can include the volume of water used during a cycle, number of times a schedule is overridden, data from a sensor and the like.

In some embodiments, the central controller can receive data from external sources that can include weather information, watering restrictions, landscape service provider information, and the like. Again, the central controller can generate scheduling data, including single- or limited-event overrides, based on this information. For example, water authorities can promulgate watering restrictions which the central controller can implement on behalf of landscape owners and service providers can create single-event override instruction to either water or delay watering after fertilization. Moreover, such scheduling can be customized for particular sprinkler zones.

In some embodiments, the central controller can generate an irrigation schedule using a baseline irrigation schedule and adjusting it according to characteristics or another irrigation schedule or using another irrigation schedule as a baseline and adjusting it according to characteristics. The central controller can implement an algorithm for determine whether an irrigation schedule is a suitable baseline from which to generate another irrigation schedule.

The central controller can be implemented as a single computer server containing programming instructions or in communication with a memory containing programming instructions. In some embodiments, central controller can be implemented as a distributed computing platform (i.e., cloud-based). Those of skill in the art can appreciate that central controller can be arranged using a number of different hardware and software configurations.

As used in this specification, the singular forms "a," "an," and "the" include plural referents unless the context clearly dictates otherwise. Thus, for example, the term "a module" is intended to mean a single module or a combination of modules.

In referring to the drawings, like or similar elements are designated with identical reference numerals throughout the several views. FIG. 1 illustrates an embodiment of a specially-programmed computer 100 that can implement one or more of the foregoing components in accordance with some embodiments. Such a computer 100 can include a network communications interface 110, storage medium 120, memory 130, program instructions 140, and processor 150. Program instructions 140 can be used to implement one or more of the components or portions of components of the system 100. Moreover, in some embodiments, additional hardware components of computer 100 can be included that implement one or more of the components or portions of components of the system 100. The storage medium 120 can be a hard disk drive, but this is certainly not required, and other storage media can be used with disclosed embodiments. In addition, the storage medium 120, which is depicted for convenience as a single storage device, may be realized by multiple (e.g., distributed) storage devices. Moreover, some embodiments can include one or more storage devices external to computer 100.

Figure 2:
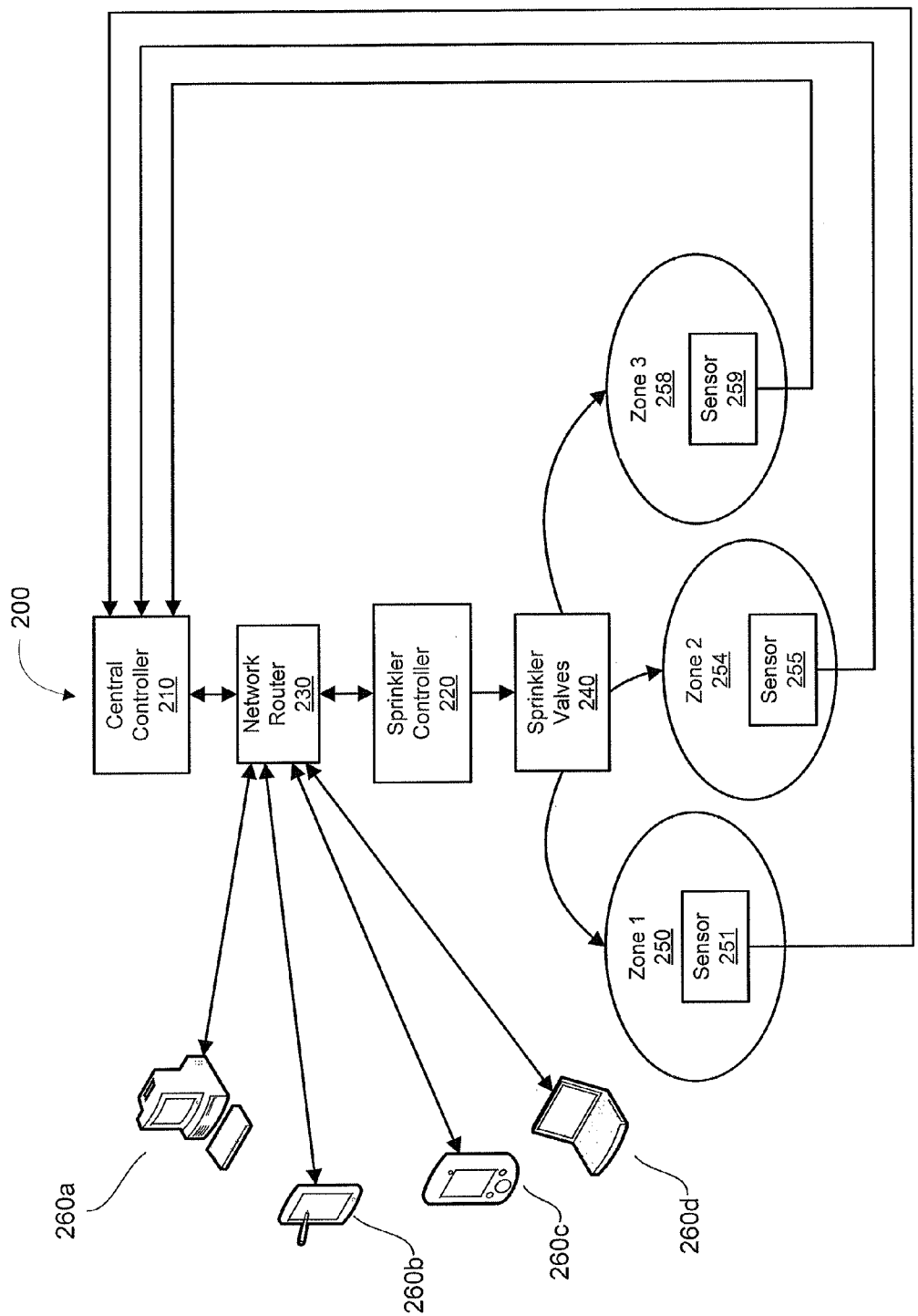
FIGS. 2-4 illustrate block diagrams of systems that allow for control and scheduling of sprinkler systems in accordance with some embodiments.

FIG. 2 illustrates a schematic block diagram of a system 200 that allows for control and scheduling of sprinkler systems in accordance with some embodiments. System 200 includes a central controller 210 that implements the control and scheduling of sprinkler controller 220. Central controller 210 can communicate with sprinkler controller 220 via network router 230. Sprinkler controller 220 is a specially programmed controller than can receive, via network communications interface, and store irrigation scheduling data, can receive instructions for running sprinkler valves 230 via a network communications interface, and send signals for turning sprinkler valves 240 off and on. Sprinkler valves 240 can be typical commercially-available sprinkler valves or specialty sprinkler valves developed for use with an embodiment.

In the embodiment shown, sprinkler valves 240 control water flow to three zones 250, 254, 258. Each zone can have one or more nozzles. Additionally, each zone includes a sensor for capturing meteorological information and transferring data related to the meteorological information to sprinkler controller 220. In some embodiments, one or more zones may not have a sensor. Further, in some embodiments, one or more of sensors 251, 255, 259 can transfer data to central controller 210. Sensors 251, 255, 259 can be typical commercially-available sensors or specialty sensors developed for use with an embodiment. It should be understood that embodiments can be used with current commercially-available sprinkler systems and no particular or special sprinkler nozzles or valves are required. Embodiments can work with any sprinkler valve or sensor. Furthermore, sensors are not required for embodiments to operate. Sensors 251, 255, 259 can send information to the central controller 210 directly, via network router 230, via sprinkler controller 220, or via some other device. Sensors 251, 255, 259 can be configured to collect and send information in a format usable by sprinkler controller 220, central controller 210, or both for purposes of scheduling. It should be understood that any of the embodiments illustrated in FIGS. 3, 4, and 6-8 can include sensors.

Network router 230 can be a local wireless or wired network router than connects to the internet. In some embodiments, network router 230 can be combined with sprinkler controller 220. Network router 230 can also be a cellular device that communicates with central controller 210 through the internet via a cellular network or through a dedicated or proprietary network. Consumer devices 260a-d can be specially programmed devices to send and receive sprinkler controller data, zone data, irrigation schedule data, other data related to irrigation schedules from central controller 210 or other data sources described herein via network router 230. In other embodiments, consumer devices 260a-d can be in communication with central controller 210 via some network router other than network router 230, via cellular network, or some other dedicated or proprietary network. Consumer device 260a-d can be a mobile phone, desktop computer, laptop computer, tablet computer server computer, or some other computing device. Those of skill in the art can appreciate the different types of consumer devices that can send network traffic data, receive network traffic data, or both and that be used with disclosed embodiments.

It should be understood that in some embodiments, central controller 210 and sprinkler controller 220 can be combined into a single device. That is, central controller 210 can implement the control and scheduling of sprinkler controller 220 or vice versa. Additionally, central controller 210 can be located at the sprinkler controller site or some other location. Moreover, it should be understood that central controller 210 described in FIGS. 3-4 and 5-9 can similarly be combined with sprinkler controller 220, located at a sprinkler controller site, or some other location.

Figure 3:
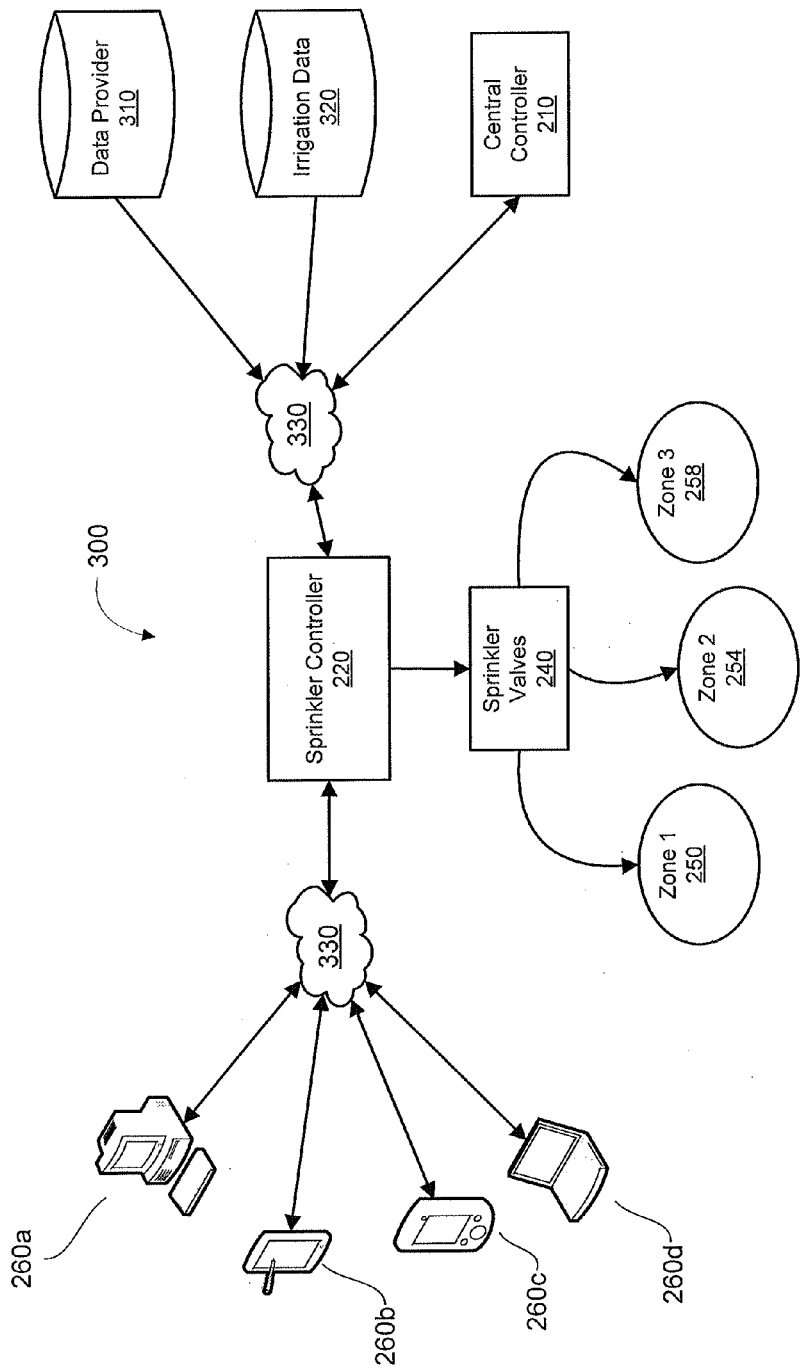

Referring now to FIG. 3, a block diagram of a system 300 that allows for the control and scheduling of a sprinkler system in accordance with some embodiments is illustrated. The system 300 includes central controller 210, irrigation data 320, data provider 310, network 330, sprinkler controller 220, sprinkler valves 240, zones 250, 254, 258, and devices 260a-d. Central controller 210 is in communication with data provider 310, irrigation data 320, and sprinkler controller 220 via network 330. Central controller 210 can be single computer server or multiple computer servers operating either in conjunction or separately. For example, a sprinkler controller can be in communication with one central controller while another sprinkler controller can be in communication with another central controller.

Data provider 320 is a third-party data source that provides information useful for determining irrigation schedules. Examples of data providers include sources for: historical and forecast weather data, prevailing soil and turf types for particular regions, watering restrictions, water pressure and usage, sprinkler valve and nozzle types and configurations, and the like.

Irrigation data 320 can be a database or some other data store for maintaining a persistent record of irrigation schedules for sprinkler zones. Irrigation data 320 can be hosted on the same computer server as central controller 210 or on a data server hosted or maintained by the same or different entity either at the same physical location as the entity that hosts or maintains central controller 210. In other embodiments, irrigation data can be hosted at sprinkler controller 220 and central controller 210 can communicated with sprinkler controller 220 to retrieve and send scheduling data when needed. Both current and historic irrigation schedules can be stored. Irrigation data 320 can also include qualitative and quantitative information related to an irrigation schedule, a zone, or both.

Central controller 210 can use such information to adjust scheduling data. In one embodiment, central controller 210 can determine that the number of times a watering cycle for a zone is overridden reaches a predetermined threshold which prompts the central controller 210 to send a new irrigation schedule or instructions for creating a new irrigation schedule at the sprinkler controller 220 based on adjustments determined from the overrides. For example, a homeowner can override an irrigation schedule currently set to run a watering cycle for a zone every Saturday morning but the homeowner overrides the cycle four times over six weeks. A predetermined threshold of four overrides over six weeks can be set and central controller 210 determines new scheduling data and sends the scheduling data to sprinkler controller 220. In some instances, central controller 210 can base the new scheduling data on the times the homeowner chose to run a cycle. In other instances, central controller 210 can base new scheduling data on an optimal irrigation schedule that simply avoids the times when the homeowner overrode the cycle.

Irrigation data 320 can also store characteristic data for the sprinkler zones. Characteristic data can include geolocation data for a zone, such as zip code information, address, or coordinates; characteristics related to the landscape such as soil type (sandy, loamy, clay, etc.); turf type, shade information, slope information, vegetation type (e.g., lawn, garden, xeriscaping, etc.), runoff or drainage information, zone area, or vegetation information (e.g., lawn, trees, flowers, etc.); sprinkler characteristics, such as nozzle type, number of nozzles, make, model, flow rate, water presser; and the like. Characteristic information can be stored as descriptive text or representative values. In some embodiments, irrigation data 320 can also include climate or weather characteristics for a zone. In other embodiments, climate or weather characteristics can be retrieved from an external data source when needed.

Central controller 210 can include a network communication device to send and receive information from sprinkler controller 220 and other devices 260*a-d* consistent with embodiments described herein. Furthermore, central controller 210 can include a module for generating irrigation schedules for a zone controlled by a sprinkler controller and can base an irrigation schedule on information associated with the zone including the zone and sprinkler system characteristics described above and qualitative and quantitative data associated with other zones that are similarly situated.

For example, for zones that have a soil type that drains more rapidly, central controller 210 can generate an irrigation schedule that includes more frequent, but shorter cycles. If the turf type requires longer watering cycles, the cycle time for one or more cycles can be increased. As another example, if a zone's sprinkler valve type or sprinkler system flow characteristics indicate that a larger volume of water is delivered over time, the cycle time for one or more of the cycles can be decreased. Likewise, if the valve type or flow characteristics indicate that a smaller volume of water is delivered over time, the cycle time for one or more of the cycles can be increased. Similarly, the cycle time for one or more cycles for a zone can be increased where the zone has little or no shade or decreased where the zone has more shade. Cycle times can be increased or decreased based on the time the cycle is run. In some instances, a sprinkler type can be a rotor type or stationary type. For a zone where the sprinkler type is rotor, where the rotation range is greater, or where the spray range is greater, cycle times can be increased. And for a zone where the sprinkler type is stationary, where the rotation range is smaller, or where the spray range is smaller, cycle times can be decreased. These and other effects on irrigation schedules by these and different characteristics are further described below in connection with other embodiments.

The central controller 210 can match a zone for which an irrigation schedule is to be generated to another zone with similar characteristics based on one or more criteria. A match can be made when a sprinkler controller is initially registered, upon receiving a request to update a zone's irrigation schedule, or according to some predetermined interval (e.g., the sprinkler controller is configured to request an update at the beginning of every watering season, once per month, etc.) An exemplary zone can be selected for the match where qualitative information associated with the zone or its landscape's condition can be used to determine whether the zone should be selected as exemplary. In some instances, multiple zones can be selected as exemplary and their irrigation schedules can each serve as a baseline or averages of their irrigation schedules can serve as a baseline. In some instances, a match can be based on geolocation (e.g., zip code, zip+4, distance, and the like).

For example, central controller 210 can determine a similarly situated zone that schedules a three cycles in a 1 hour period at five minutes per cycle three times a week at 6 AM watering 3 times a week at 5 minutes per cycle and for which qualitative information associated with the zone indicates the schedule is optimal. That zone shares the same soil and turf types as the zone for scheduling but has rotor sprinklers and low shade where the zone for scheduling has stationary sprinklers and high shade. Accordingly, central controller 210 can determine that the irrigation scheduling can serve as a baseline but must be altered. Because the zone for scheduling has stationary sprinklers and high shade, the cycle times are shortened to three minutes. The irrigation schedule is otherwise left unchanged. Algorithms for zone matching are described further below.

The irrigation schedule can be sent to a device 260*a-d* for acceptance. Upon receiving a signal that the irrigation schedule is accepted, instructions for running the sprinkler controller for the zone are sent to the sprinkler controller 220. In some instances, the instructions can be sent to the sprinkler controller 220 without waiting for or receiving a signal indicating the schedule was accepted. In some instances, the irrigation schedule can be sent to a device of the homeowner and the central controller 210 can receive adjustments from device 260*a-d* for the irrigation schedule. In other instances, the device 260*a-d* can send quantitative or qualitative feedback related to the irrigation schedule and the central controller 210 can adjust the schedule according to the feedback. For example, a signal from device 260*a-d* can indicate that the zone is under-watered and the central controller 210 can increase cycle times, increase the number of cycles, or some combination thereof. The adjustment based on the qualitative information can be based on zone characteristics in the same way the irrigation schedule is based on zone characteristics. For example, if the soil type indicates the zone will have faster drainage, the number of cycles, rather than the cycle times, can be increased. Similarly, if the sprinklers are rotor sprinklers the cycle times can be increased by a larger increment than if the sprinklers are stationary.

Adjusting an existing schedule of a zone for use in another zone can take into account each of the characteristics of the zone or a subset of the characteristics for the zone. Adjustments can include adjustments to cycle days, number of cycles, cycle times, cycle durations, or some combination thereof. One of ordinary skill in the art can appreciate that different zone, location, and sprinkler characteristics will demand adjustment of scheduling in different ways and how each characteristic can influence how often and for how long a watering cycle should be run. In some instances, a characteristic can indicate that the zone should be watered more or less than the other zone based solely on that characteristic. Thus, in some instances, taking more characteristics into account can result in a number of different adjustments and, ultimately, there may be no changes to the other zone's schedule because all of the adjustments net no changes.

Central controller 210 can also receive qualitative information associated with a zone indicating the zone is overwatered. In response, the central controller 210 can find a similarly situated zone that has received qualitative information indicating the irrigation schedule is optimal. As a result, the central controller 210 could adjust the irrigation schedule to be more like the other zone's irrigation schedule. In some instances, the existing irrigation schedule can be replaced with the other zone's irrigation schedule. In other instances, the irrigation schedule can be replaced with an adjusted version of the other zone's irrigation schedule.

Central controller 210 can generate a baseline irrigation schedule based on a single criterion or start with a default irrigation schedule. In some embodiments, central controller 210 can forego generating a baseline schedule and generate an irrigation schedule taking into account a number of factors or criteria.

Central controller 210 can send a signal via network 330 to sprinkler controller 220 to activate an irrigation schedule after a sprinkler system has been deactivated for a season. The activation signal can be sent at a time determined to be optimal for the zone based on the geolocation information for the zone and/or the zone characteristics. For example, for a zone that is in a warmer climate, that has a less drought-resistant turf, and that has experienced or is forecasted to have dry weather, an activation signal can be sent earlier. Whereas for another zone that is identically or similarly situated (e.g., same neighborhood) but has a more drought resistant turf, an activation signal can be sent later. In some embodiments, central controller 210 can send an activation signal to a device 260a-d in addition to or instead of sending an activation signal to sprinkler controller 220.

Zone characteristics, sprinkler system characteristics, and geolocation characteristics can be received from consumer input via device 260a-d, sprinkler controller 220, or some other device. In some embodiments, some characteristics can be derived or approximated based on other known characteristics at central controller 210 or sprinkler controller 220. For example, soil type and prevailing turf type can be approximated from geolocation information or nozzle type can be determined from a make and model of sprinkler system. Those of skill in the art can appreciate that certain characteristics can be approximated or determined from another characteristic.

Both owners and third parties can have access to the sprinkler controller 220 and an irrigation schedule. Central controller 210 can provide full access to certain persons or devices 260a-d while limiting access to others (e.g., third parties). For example, the central controller 210 can provide a predetermined window of time during which a third party or third party device can access an irrigation scheduling for a zone or override irrigation schedules, including activating a cycle. In some instances, a landscaper or other service provider can activate a single-event override after service, send a request to shut off a zone for service, or implement a temporary or permanent irrigation schedule. This access to a zone's irrigation schedule can be accomplished through a computing device of the service provider without requiring access to the sprinkler controller or sprinkler valves.

In some instances, a water authority can send requests to alter irrigation schedules, status indicators associated with water supply, and the like, to a central controller 210. In response, the central controller 210 can alter irrigation schedules accordingly. In some instances, a central controller 210 can send messages to homeowner devices about the request or status indicator. Irrigation schedules can be configured to allow or deny changes according to water authority requests or status indicators.

As discussed above, sprinkler controller 220 is capable of storing irrigation scheduling data and can receive overrides over a network connection. In some instances, sprinkler controller can be controllable only via instruction signals from central controller 210 or can include manual override controls or an interface similar to an interface of device 260a-d.

Consumer device 260a-d can include software to communicate with central controller 210, with sprinkler controller 220 via central controller 210, or directly with sprinkler controller 220. In some instances, consumer device 260a-d can bypass any security for sprinkler controller 220 through the local network to communicate directly with the sprinkler controller 220 and to access an irrigation schedule for a zone. In such instances, a time window can be configured to allow such a bypass.

Furthermore, consumer device 260a-d can be programmed to provide information about irrigation schedules and provide an interface through which a user can provide quantitative or qualitative information either to the central controller 210, sprinkler controller 220, or both. Embodiments of an exemplary consumer device 260a-d and interface are discussed further below.

Figure 4:
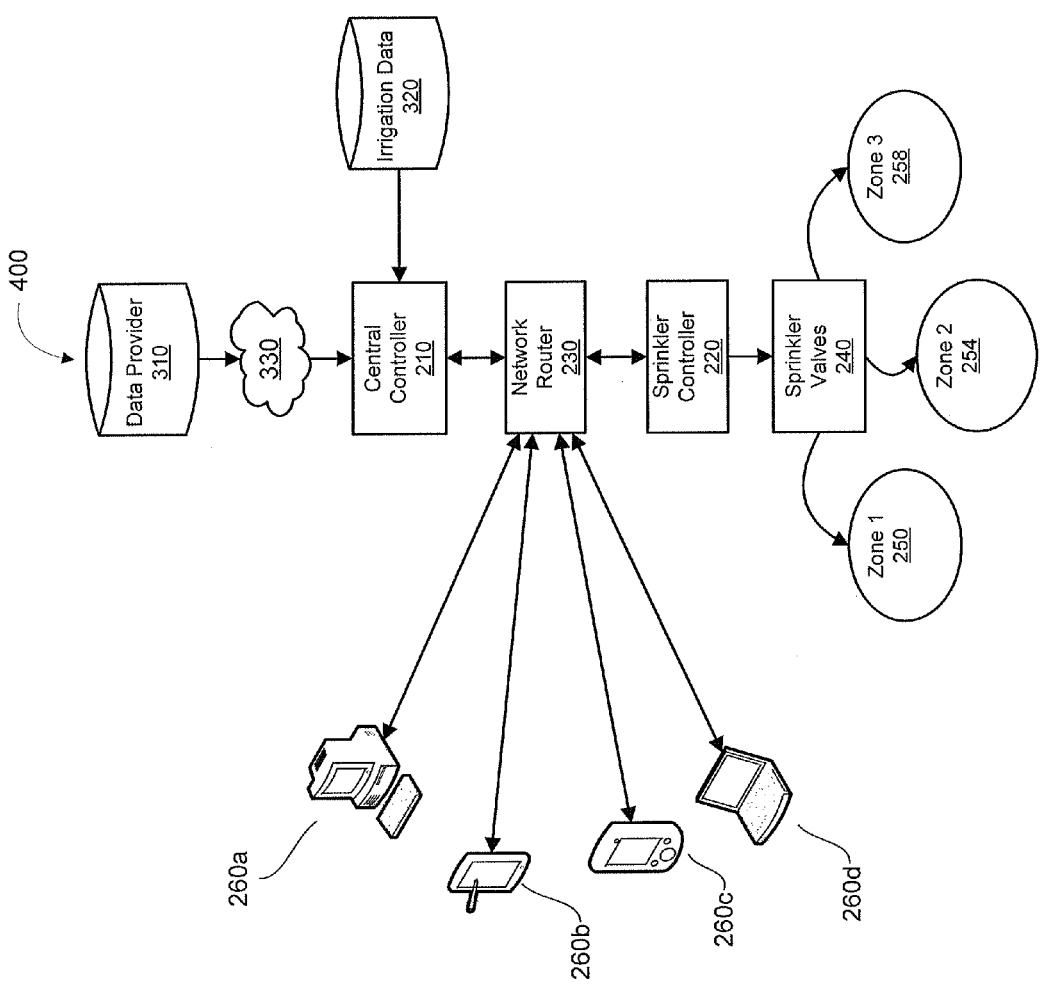

FIG. 4 illustrates a block diagram of a system 400 that allows for the control and scheduling of a sprinkler system in accordance with some embodiments. Central controller 210 can communicate with sprinkler controller 220 via network router 230. In addition, central controller 210 can receive data from data provider 310 for adjusting irrigation schedule data. Irrigation data 320 can be a data store for storing irrigation schedule data and other data from data provider 310 and data received from sprinkler controller 220. Irrigation data 320 can be maintained or hosted by the same entity that maintains or hosts central controller 210. In some embodiments, central controller 210 and irrigation data 320 can be hosted on the same physical server. In other embodiments, central controller 210 and irrigation data 320 can be hosted on separate physical servers that comprise part of the same internal network. In yet other embodiments, central controller 210 and irrigation data 320 can be hosted on separate physical servers that comprise parts of separate internal networks and that are in communication over the internet.

Figure 5:
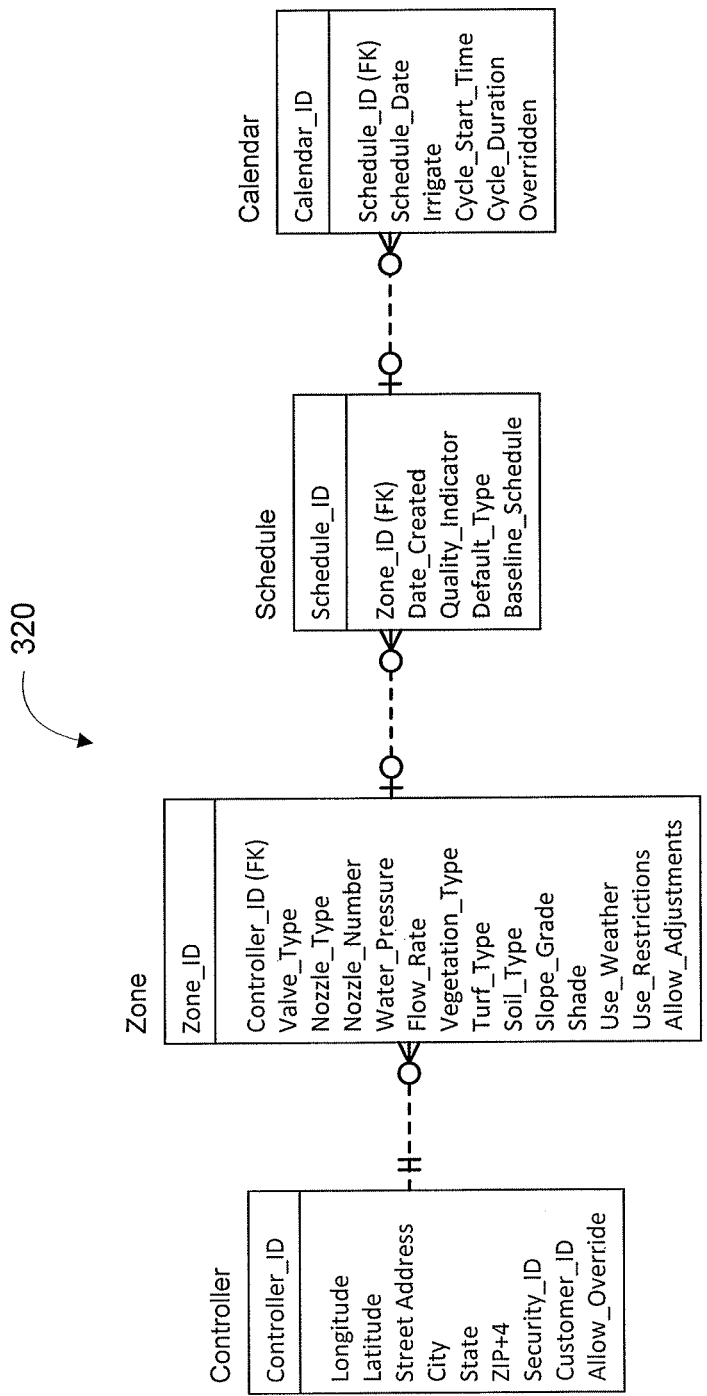
FIG. 5 illustrates a schematic of irrigation data in accordance with some embodiments.

FIG. 5 illustrates an embodiment of irrigation data 320 that can be stored either at central controller 210, on a different server in communication with central controller 210, at sprinkler controller 220 or at some other data store.

Irrigation data 320 includes records for controllers, zones, and schedules. Controllers have geolocation information such as longitude, latitude, and address data. Additionally, customer and security information is associated with controller. Security information can include login information, including temporary passwords or login credentials for third parties to temporarily access irrigation data 320, for example, to override an irrigation schedule. Furthermore, controllers can be assigned a flag indicating whether irrigation schedules can be overridden. For example, a customer might want to prevent central controller 210 from allowing an override to an irrigation schedule either permanently or temporarily. In that case, the customer can have the option of turning on and off the flag at the customer's convenience. In other embodiments, a flag to indicate whether an irrigation schedule can be overridden can be associated with a zone, a schedule, a customer, or some other data entity. Likewise, each of the data items described in association with a controller can be associated with a customer, a zone, or some other data entity.

Irrigation data 320 also includes zones associated with a controller. Each zone can have characteristics including: valve type (valve_type), nozzle type (nozzle_type), number of nozzles (nozzle_number), water pressure (water_pressure), flow rate (flow_rate), vegetation type (vegetation_type), turf type (turf type), soil type (soil_type), grade of slope (slope_grade), shade, whether to adjust irrigation schedules based on weather forecasts (use_weather), whether to override or adjust irrigation schedules based on watering restrictions regulations or ordinances (allow_restrictions), whether to adjust irrigation schedules (allow_adjustments). Each of these and other data items can be updated to account for changes over time in the landscape which, in turn, calls for a change in an irrigation schedule. For example, over time, shade in a zone can increase as trees in the zone or neighboring tress mature or fences or other structures are erected. In other embodiments, each of these data items can be associated with some other data entity and each of the data items can be further separated or combined for the storage of information related to a zone or other data entity. Moreover, it should be understood that other data items discussed herein can also be associated with a zone or with some other data entity, including other zone characteristics, geolocation data, and sprinkler characteristics described herein. Further, data items can be further separated to provide additional detail or further combined to provide less data granularity.

Irrigation data 320 also includes schedule data. Schedule data can include a date on which a schedule is created (date_created), a qualitative indicator (quality_indicator), default schedule type (default_schedule), and an associated baseline schedule (baseline_schedule). A zone can have multiple associated schedules in which one of the schedules is active and other schedules are historical. The quality indicator can hold a qualitative value associated with the schedule. Again, the indicator can be a text description or a value representative of a quality. For example, a qualitative indicator can be a value within a range (e.g., 1 to 5, 1 to 10, A to E, and the like) or a text value such as "severely under-watered," "under-watered," "slightly under-watered," "healthy," "slightly over-watered," "over-watered," "severely over-watered." Other examples of represented values that can be stored as qualitative indicator or another qualitative indicator can indicate that cycle times are optimal, too short, or long; number of cycles are optimal, too few, or too many; cycle start times or days are acceptable or unacceptable; and the like. By tracking one or more qualitative indicators with a schedule, future adjustments can be checked against historical schedules so that where an earlier schedule was sub-optimal, an adjustment can be tailored to avoid a similar schedule.

Moreover, qualitative indicators can be tracked historically so that a particular schedule has multiple qualitative indicators over time even though the schedule does not change. In this way, historic qualitative indicators for a schedule can be matched against historical weather data. That is, for example, an embodiment can track two or more qualitative indicators for a particular irrigation schedule for a zone, one that indicates a healthy lawn during a time with a particular prevailing weather pattern (e.g., more rainfall than is typical) and another that indicates a less than healthy lawn during a time with a different prevailing weather pattern (e.g., less rainfall than is typical). In this way, irrigation schedules can be adjusted to take into account historic landscape health and historic meteorological data. In addition, algorithms for determining an irrigation schedule or an adjustment to an irrigation schedule can account, not only qualitative indicators, but changes to zone characteristics over time also. More specifically, where an historical irrigation schedule was sub-optimal according to a qualitative indicator, that same historical irrigation schedule may no longer be sub-optimal given changes to zone characteristics.

Still referring to FIG. 5, a schedule can be a default schedule (default_type). For example, a schedule can be every even day, every odd day, every third day, every Monday, Wednesday, and Friday, and the like. A default schedule type can be an integer or some other short indicator or can be a text description of a default schedule available to a customer. Irrigation data 320 can store a default schedule type selected by a customer as an irrigation schedule. A schedule can also be a baseline schedule that is further adjusted to other schedules as described herein. In particular, a baseline schedule can be the initial default schedule selected by a customer or selected on behalf of the customer for a zone or can be an irrigation schedule generated based on zone and/or sprinkler characteristics. A baseline schedule can then be adjusted to generate other irrigation schedules based on qualitative information about the health of the zone landscape. In the embodiment shown, a baseline schedule is saved for historical purposes.

Irrigation data 320 includes a calendar data entity for storing the cycle information for a schedule. In the embodiment shown, a calendar with a date (schedule_date), whether the irrigation is scheduled for that date (irrigate), the start time of the cycle (cycle_start_time), the duration of the cycle (cycle_duration), and whether the cycle will be or was overridden (overridden). In the embodiment shown, overridden indicates whether the watering cycle as represented by the calendar record will be or has been overridden. In this way, another calendar record can be created if the override creates a different cycle start time or duration or a cycle on another day is to run in lieu of the overridden cycle. Here, a calendar record is created for every day and includes an indicator in the irrigation field indicating whether irrigation is scheduled. In other embodiments, a calendar can include records only for those days where irrigation is schedule, thus, eliminating the need for the irrigate field.

Some embodiments can store information about cycle overrides. For example, irrigation data can also include whether a cycle was turned off or prevented from running. If a cycle is extended, the added cycle duration can be tracked. Additionally, if a cycle is added, a record representing the added cycle can be included in the irrigation data.

Some embodiments can store default schedules such that no specialized irrigation schedule needs to be generated, rather a default schedule, already created, is implemented. For example, a default schedule can include a cycle every odd day that waters a zone for a particular duration at a particular time. Other default schedules can include every even day, every third day, every Monday, Wednesday, Friday, and the like. In some instances a default schedule can include defaults only for the scheduled days but require customization of cycle times and duration or some other combination of default values and customized values.

Some embodiments can implement a data entity other than a calendar structure to maintain cycle days, times, and durations. In particular, some embodiments can maintain a more abstract data entity that can store schedules similar to default schedules described above. For example, a simpler irrigation schedule can be maintained by day of the week. In such an embodiment, irrigation data 320 could include a data entity associated with a schedule that includes a record for each day of the week with cycle times and durations for each day. There also could be multiple day records for a schedule such that multiple cycles can be run on a particular day. It should be understood that date, day of the week, cycle start time, and cycle duration can be organized and stored in a number of ways in different embodiments and the invention is not limited to a particular organization of those and other, similar data points used to organize an irrigation schedule.

For irrigation schedules that are stored in more abstract data structures, a sprinkler controller can include processing logic to interpret such schedules to determine when to turn on and off a sprinkler valve after the schedule is sent to the sprinkler controller. Similarly, a central controller 210 can include processing logic to determine when to turn on and off a sprinkler valve based on a more abstract data structure and send instructions or an irrigation schedule according to those instructions to a sprinkler controller.

It should be understood that FIG. 5 is illustrative and other embodiments can implement other data structures or other data storage techniques for organizing and storing irrigation data 320, including controller, zone, and irrigation schedule data. In particular, controller, zone, and irrigation schedule data as described above, along with other information, can be stored in a different logical format in a relational database. Each of the data entities can be further combined or separated such that controller and zone data are stored together or zone data is further separated. It should be understood that the same can apply to each of the data entities illustrated in FIG. 5. In yet another example, rather than storing data in a relational database, flat files can be used both for persistently storing data and for transferring data from a data server or the host computer to a sprinkler controller and vice versa. It should be further understood that data entities within irrigation data 320 can be stored on the same or different physical servers.

In some embodiments, historical data, including calendar data can be stored for a predetermined amount of time so that adjustments can take into account historic irrigation schedules and qualitative information about the schedules. For example, where an irrigation schedule is generated for a zone and the schedule closely matches an historical schedule that included a qualitative indicator that suggests the landscape health was suboptimal, further adjustments can be recommended.

Figure 6:
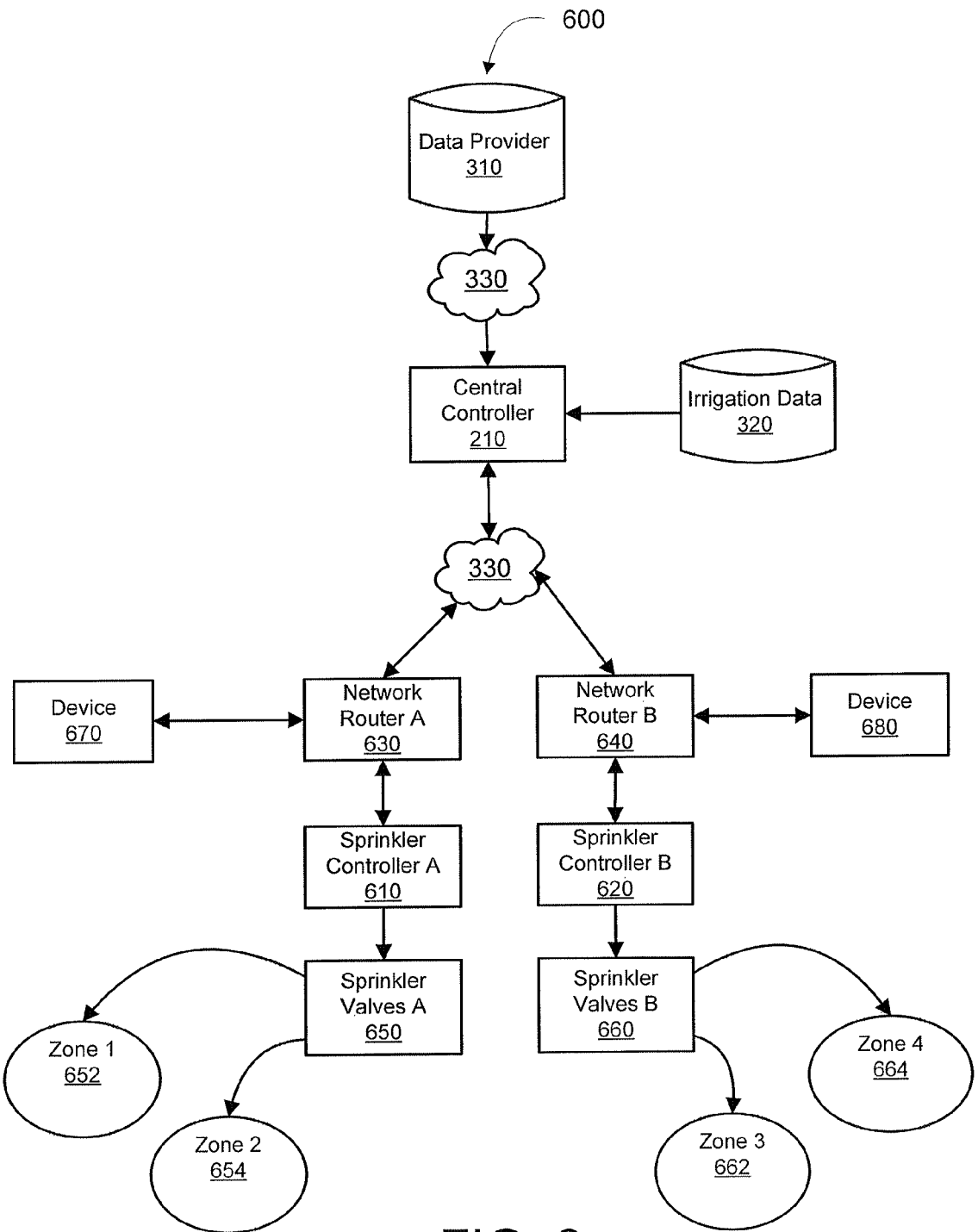
FIGS. 6-8 illustrate block diagrams of systems that allows for control and scheduling of sprinkler systems in accordance with some embodiments.

FIG. 6 illustrates a block diagram of a system 600 that allows for the control and scheduling of multiple sprinkler systems in accordance with some embodiments. Central controller 210 can be in communication with sprinkler controller A 610 via network router A 630 and with sprinkler controller B 620 via network router B 620. Additional sprinkler controllers can be in communication with central controller 210. Irrigation data 320 can be used to store irrigation schedule data for zone 1 652 and zone 2 654 of sprinkler controller A 610 and sprinkler valves A 650 and zone 3 662 and zone 4 664 of sprinkler controller B 620 and sprinkler valves B 660. Irrigation data 320 can store irrigation schedule data for zones of sprinkler controller A 610 and sprinkler controller B 620. In some instances, irrigation schedule data for a zone of sprinkler controller B 620 can be used to generate irrigation schedule data for a zone of sprinkler controller A 610 and vice versa as explained further below.

Device 670 can have access to central controller 210 and/or sprinkler controller 610 via network router A 630 while device 680 can have access to central controller 210 and/or sprinkler controller 620 via network router B 640. Each of devices 670, 680 can be similar to devices 260a-b. Device 670 can be programmed so that the only sprinkler controller accessible is sprinkler controller 610. Similarly, sprinkler controller 610 or central controller 210 can be programmed so that device 670 can access (i.e., read or update) irrigation data for only sprinkler controller 610. Moreover, access can be limited to reading data or updating data only. Furthermore, sprinkler controller 620 or central controller 210 can be programmed so that device 670 has full or limited access to irrigation data for sprinkler controller 620 as well.

Figure 7:
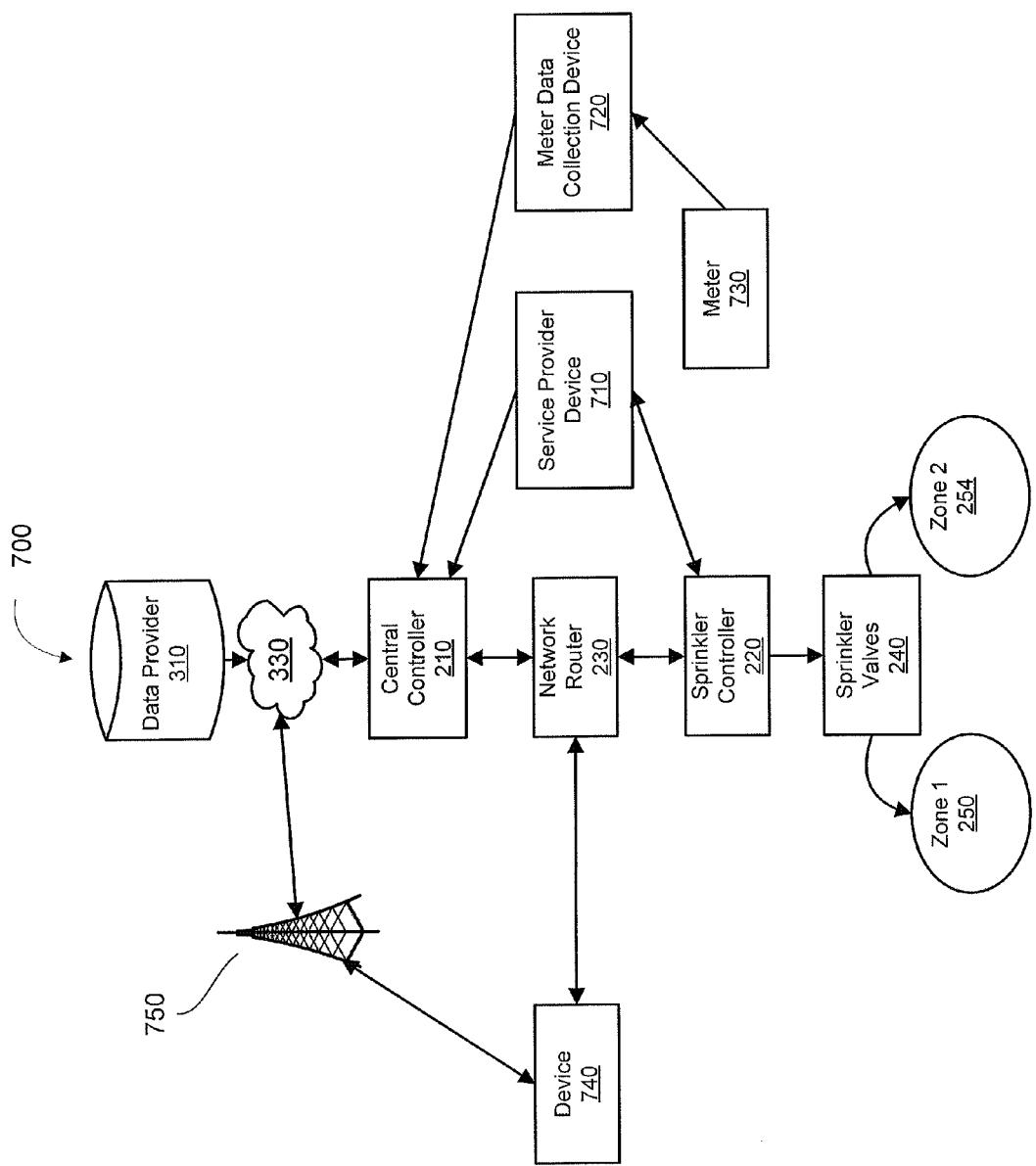

FIG. 7 illustrates a block diagram of a system 700 that allows for the control and scheduling of a sprinkler system in accordance with an embodiment. Central controller 210 can include a module for receiving signals from a service provider device 710. In some instances, a signal from a service provider device 710 can include an instruction to override irrigation schedule data for a zone of sprinkler controller 220. In some embodiments, sprinkler controller 220 can be configured to receive a signal from service provider device 710. Central controller 210 can be configured to modify a security profile of sprinkler controller 220 so that sprinkler controller 220 can accept the signal from service provider device 710. Sprinkler controller 220 can include a module that controls secure access to irrigation schedule data or instructions for operating sprinkler valves 240. Thus, in some embodiments, sprinkler controller 220 can receive instructions to operate sprinkler valves 240 directly from another device that normally lacks authority.

Device 740 can be similar to devices 260a-d and can communicate with central controller 210 via radio-based communication service 750. Such service can be a cellular network or some other communications method including a dedicated or proprietary networking service. It should be understood that a device 740 that includes a radio transceiver to communicate over a radio-based network can be used with other embodiments.

Central controller 210 can also be in communication with meter data collection device 720. Meter data collection device 720 can be equipment at a water meter 730 for sprinkler valves 240. Meter data collection device 720 can be in communication with a water authority data service so that irrigation schedules can be adjusted based on usage and/or watering restrictions. In other embodiments, meter data collection device 720 can be the meter 730 itself, integrated with the meter 730, or can be some portable equipment that can be in communication with meter 730. In yet other embodiments, meter data collection device 720 can be equipment that tracks water flow at sprinkler valves 240 or some other physical location along the water flow path or that estimates water usage based on flow characteristics and actual valve on-time at a sprinkler valve 240 or sprinkler controller 220.

Figure 8:
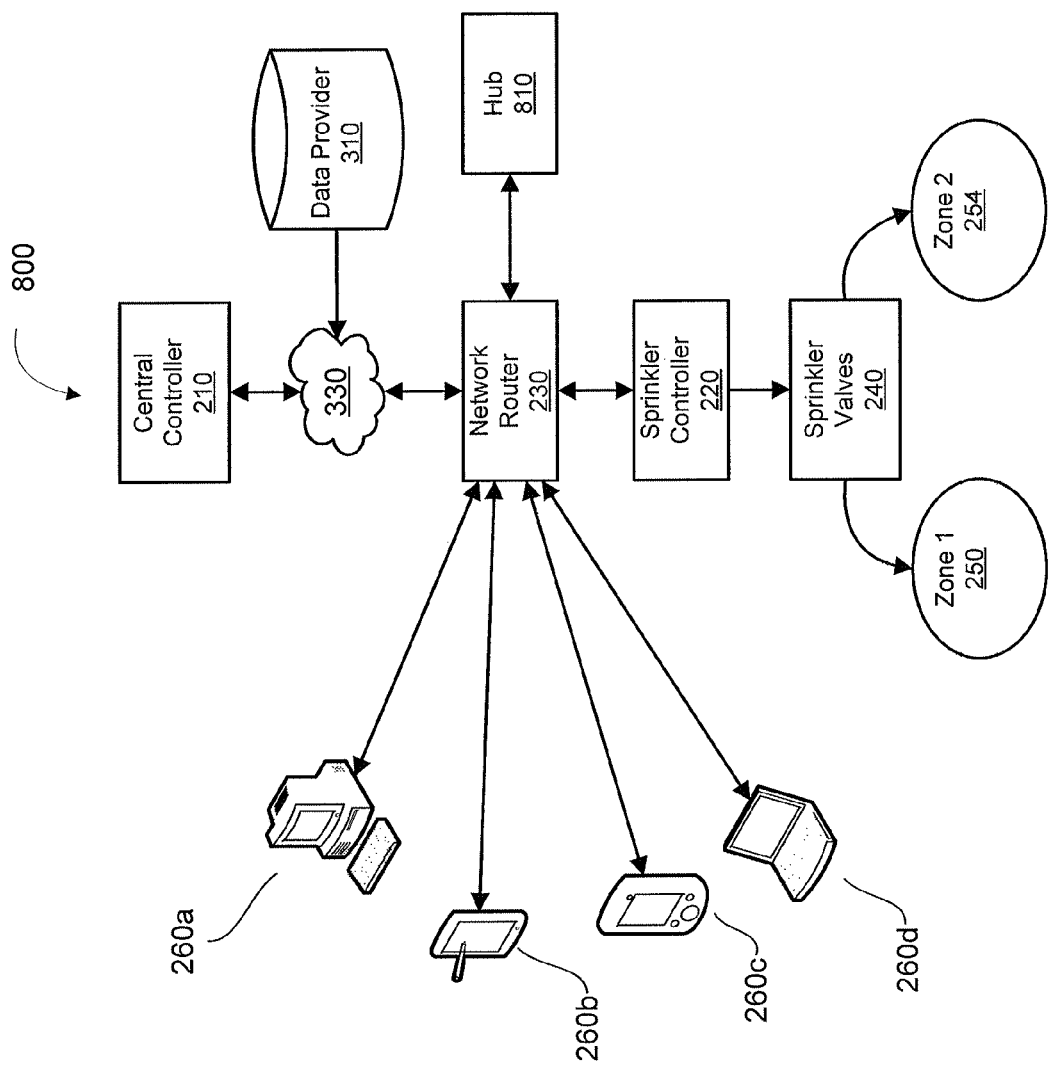

FIG. 8 illustrates a block diagram of a system 800 that allows for the control and scheduling of a sprinkler system in accordance with an embodiment. Central controller 210 can be in communication with hub 810 which can be a consumer appliance automation device. In some embodiments, central controller 210 can include a module with a programming interface which hub 810 can call to send and/or receive instructions and/or data to and/or from central controller 210. Additionally, in some embodiments, central controller 210 can include programming instructions to call a programming interface at hub 810 to send and/or receive instructions and/or data to hub 810. Those of skill in the art understand that hubs can be implemented as cloud-based services as stand-alone servers or in some other configuration. It should be understood that central controller 210 can be implemented to communicate with any of those configurations.

In some embodiments, central controller 210 can send irrigation schedule data to hub 810 for data tracking, analysis, and reporting. In other embodiments, central controller 210 can receive instructions from hub 810 for adjusting an irrigation schedule similar to a device 260a-d. In some embodiments, sprinkler controller 230 can be programmed to receive information from data provider 310 without central controller 210 requesting or including a module or programming instructions to request the information on the behalf of sprinkler controller 230. In such embodiments, sprinkler controller 230 can also include programming instructions to adjust an irrigation schedule based on the information as described elsewhere herein. It should be understood that this type of sprinkler controller 230 can be used with other embodiments than the system 800 described in FIG. 8.

Figure 9:
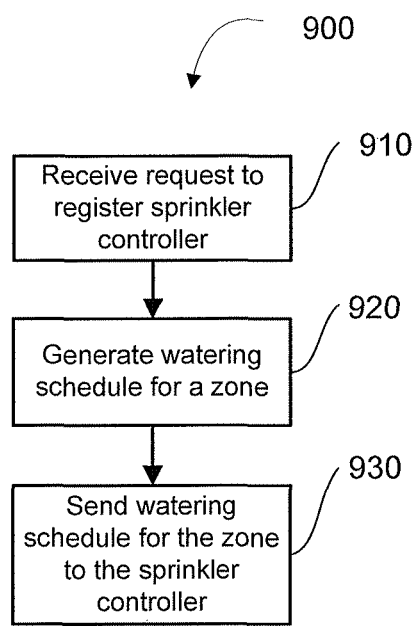
FIGS. 9-11A illustrates a method flow for registering and initializing a sprinkler system controller in accordance with some embodiments.

FIG. 9 is a flowchart illustrating a method 900 for setting an irrigation schedule for a zone of a sprinkler controller in accordance with an embodiment. At step 910, a request to register a sprinkler controller is received. The request to register a sprinkler controller can include identifying information about the sprinkler controller. In some instances, the request can include or be accompanied by other information that can identify the sprinkler controller or other information characterizing the sprinkler controller, sprinkler system controlled by the controller, or one or more landscaping zones. In some instances, the request can be received from the sprinkler controller by way of a network connection. In other instances, the request can be received from another device associated with the sprinkler controller. For example, a homeowner can use a computer or smartphone to communicate the request on behalf of the sprinkler controller. In such instances, the sprinkler controller and other device can communicate via a local network so that information from the sprinkler controller can be transferred to the other device for the request. In some instances, identifying information or other information can be manually input by a user of the device.

At step 920, an irrigation schedule for a zone of the sprinkler controller is generated. In some instances, a default irrigation schedule can be generated. A default irrigation schedule can be based on a predetermined default schedule that applies universally to all zones or can be based on default scheduling information for one or more characteristics of the zone or sprinkler system. For example, if geolocation information for a zone is known, an irrigation schedule can be generated based on a default schedule that applies to the location of the zone. The default irrigation schedule can be based on zip code information, soil type area (e.g., area based on soil taxonomy), and the like. Further, a default irrigation schedule can be based on the sprinkler type of the zone. The type of sprinkler system used for the zone may have rotor-type or stationary-type sprinkler heads. An irrigation schedule can be generated from a default irrigation schedule that has longer cycle times and that applies to rotor-type sprinkler systems or a default irrigation schedule that has shorter cycle times and that applies to stationary sprinkler heads. In some embodiments, the irrigation schedule for the zone can be generated based on zone or sprinkler characteristics and/or irrigation schedules for other, similarly situated zones as described in more detail in connection with FIG. XX discussed below.

At step 930, the irrigation schedule data for the zone can be sent to the sprinkler controller. In some embodiments, an irrigation schedule can be formatted in a text file format, html format, some proprietary database or flat file format, and the like. The irrigation schedule data comprises instructions for programming a sprinkler controller. The instructions can be in the form of the cycle days, times, durations, and the like. Furthermore, the instructions can be in another form that is translated by the sprinkler controller to set the cycle days, times, durations, and the like. Those of skill in the art can appreciate that data can be packaged in different formats from transfer from one device to another and for storage. At the sprinkler controller, the irrigation schedule can take effect immediately. In some embodiments, the irrigation schedule can be configured with a start date, end date, or both, to instruct the sprinkler controller when to activate, deactivate, or activate and deactivate the irrigation schedule. For example, the sprinkler controller could have been registered during the winter months, during the very early spring when rainfall is plentiful, or at a time when the forecast calls for heavy rain and, thus, the irrigation schedule could be configured with a start date in the future.

In some embodiments, irrigation schedule data can be sent periodically thereafter and the periodic updates can accommodate changes to an irrigation schedule. In other embodiments, irrigation schedule data can be sent in response to a request signal received at the sprinkler controller or central controller or by a change to the irrigation schedule.

In some embodiments, a message indicating the start date can be sent to another device to inform a user that, despite having been successfully registered and configured, the sprinkler controller would not yet activate a zone for watering. As another example, the sprinkler controller could have been registered during the early fall just before a sprinkler system would optimally be shut down for the winter. The irrigation schedule could be configured with an end date at which the sprinkler system would be deactivated. In some instances, a message could be sent to a device indicating the end date. This can be helpful given that a sprinkler system might have to be winterized. In other instances, a message could be sent to a device as a reminder that an end date is approaching. In yet other instances, a message could be sent to a device to inform that a sprinkler system should be winterized. Such a message could be generated based on time of year, forecast, data from other zones, and the like.

Figure 10:
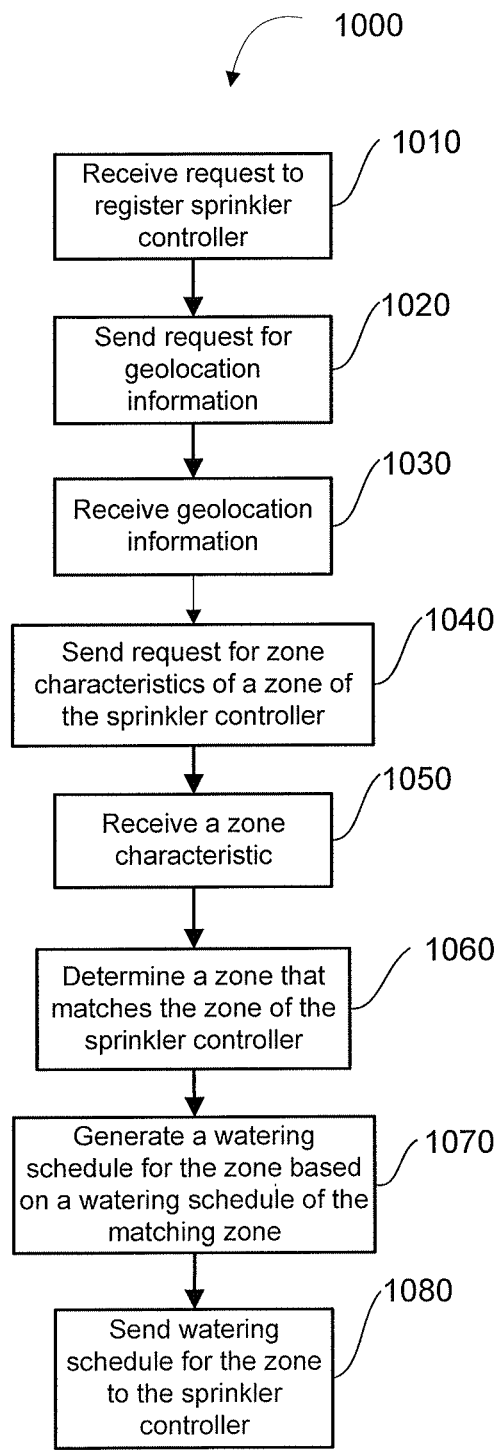

FIG. 10 is a flowchart illustrating a method 1000 for determining and setting an irrigation schedule in sprinkler controller for a zone in accordance with an embodiment. At step 1010, a request to register a sprinkler controller is received. At step 1020, a request for geolocation information of the landscaping zone can be sent. The request for geolocation information can be sent in response to receiving the request to register the sprinkler controller. In some embodiments, the request can be sent to the sprinkler controller. For sprinkler controllers equipped with an input interface, information can be entered into the sprinkler controller. In some embodiments, the request can be sent to another device and can be sent by any number of communication methods. For example, the request can be sent by SMS, by email, through an http session, through voice response, and the like. Those of skill in the art can appreciate that different protocols can be used to send messages, requests, and other information from one device to another.

At step 1030, geolocation information is received. As discussed above, geolocation information can be information identifying the location of a landscaping zone as described above. At step, 1040 a request for zone characteristics is sent. The request for zone characteristics can be sent in response to receiving the geolocation information. Again, the request can be sent to the sprinkler controller or to another device using any number of protocols. At step 1050, a zone characteristic is received.

At step 1060, an existing zone that matches the zone of the sprinkler controller is determined. In some embodiments, a matching zone can be determined based on a predetermined single zone characteristic or predetermined multiple zone characteristics. Additionally, predetermined criteria for whether two zone characteristics match can be used to determine a match. Criteria can programmed to find matches based on location only, on a subset of zone and/or sprinkler characteristics, on all zone and/or sprinkler characteristics, or some combination thereof. In some embodiments, the criteria can be changed centrally or by a user. For example, a homeowner can determine the criteria for matching zones when registering a sprinkler controller or at some other time, including at a time when a new irrigation schedule is requested. Thus, when a request to register a sprinkler controller is received or when a request to update an irrigation schedule is received at step 1010, criteria for matching zones can be received with the request.

The characteristics used to determine a match can vary. For example, for a turf type characteristic, a match can be based on whether the turf types are identical or merely in the same family. A predetermined criterion can be set such that if two turf types are drought resistant but not the same variety of turf, such as zoysia and buffalo grass, there is still a match. Further, a criterion can be set at the type level so that zoysia grass and buffalo grass do not match, but two different types of zoysia grass (e.g., El Toro zoysia grass and Empire zoysia grass) do match. Those of skill in the art can appreciate the different types of turf and levels of detail that can be used for a match. In some instances, a criterion can be predetermined to indicate simply that as long as a turf type is more drought resistant than not, the turf types match. In some instances, the matching criterion for turf can be customized based on user input rather than on turf type.

In some instances, soil types can be used to set a predetermined criterion in much the same way. For example, a predetermined matching criterion can be set so that silty and sandy soils match, but sandy or peaty soils do not. Further, a criterion can be set so that any soil that retains water to a certain extent will match. In some instances, the matching criterion can be customized based on user input rather than on the particular type of soil. Any other zone and sprinkler characteristics can be used to determine a match. Thus, in some instances, one or more matching criteria can be set such that a zone matches another zone because they share the same characteristic or type of characteristic in spite of other differences, which may or may not be significant. In this way, the matching algorithm can be customized as more is learned about what creates a suitable or optimal match in a particular location or area or with respect to particular characteristics. That is, some characteristic can bear more on whether an irrigation schedule is closer to an optimal match than that characteristic would bear in another geographic area or another characteristic would bear in that same geographic area. In some instances, in a particular geographic area, turf type may be more heavily weighted as a factor than any other factor. For example, for tropical or near tropical regions, slope and shade characteristics may vary insignificantly or have little bearing among landscapes but different types of turf and the nozzle types in two different zones will impact the irrigation schedule significantly. In another example, another geographic region can have widely varying slope characteristics but the type of turf used rarely varies. In such a case, the algorithm can be customized to favor a match based on the slope characteristics rather than the type of turf.

In determining whether a zone matches another zone, to limit the number of potential matches, potential matching zones can be limited to only those which have received a favorable qualitative indicator. That is, only those zones that have been given an indication that that irrigation is above a pre-determined threshold can be potential matching zones. A pre-determined threshold can be set to be anything at average or above or some of other indicator value.

Following is an exemplary list of zones and their characteristics to illustrate how a matching algorithm can be customized according to embodiments:

| Existing Zones | | | | | | | |
|---|---|---|---|---|---|---|---|
| Zone | Qualitative Indicator | Turf Type | Soil Type | Shade | Flow Rate (GPM) | Slope Grade | ZIP + 4 |
| 1 | 5 | Drought Resistant | Sandy | High | 1 | 0% | 80304-0471 |
| 2 | 2 | Drought Resistant | Sandy | High | 6 | 0.5% | 80304-0471 |
| 3 | 4 | Drought Tolerant | Loamy | Medium | 7 | 0% | 80304-0471 |
| 4 | 3 | Drought Susceptible | Clay | Unknown | 7.5 | 3% | 80304-0471 |
| 5 | 4 | Drought Tolerant | Clay | Low | 5 | 2% | 80304-0471 |

| Zones to Match | | | | | |
|---|---|---|---|---|---|
| Zone | Turf Type | Soil Type | Shade | Flow Rate (GPM) | Slope Grade | ZIP + 4 |
| A | Drought Resistant | Sandy | High | 6.5 | 0% | 80304-0471 |
| B | Drought Resistant | Clay | High | 6 | 1% | 80304-0471 |

In one instance, turf type, soil type, shade, flow rate, slope grade, and zip+4 can be used as matching criteria:

| Zone Matching Criteria | |
|---|---|
| Minimum # of characteristics: | 3 |
| Turf Type: | Yes |
| Soil Type: | Yes |
| Shade: | Yes |
| Flow Rate: | Yes |
| Slope Grade: | Yes |
| ZIP + 4: | Yes |

Here, Zone A can match Zones 1 and 2 because they share the same turf type ("drought resistant"), soil type ("sandy"), shade ("high") and zip+4 ("80304-0471"), even though the flow rate and slope grade differ. As shown, a threshold (minimum # of characteristics) can be set so that a predetermined number of characteristics must match to find a matching zone. In this example, at least 3 characteristics match for Zones 1 and 2. The algorithm can be altered to further narrow whether a zone matches. For example, setting the minimum # of characteristics to 4 would result in only Zone 1 matching given that Zone 2 has a different slope grade of 0.5%. In the example in which Zones 1 and 2 match, other criteria can be used to determine which matching zone is most optimal. Other criteria include, the number of matching characteristics (Zone 1 has 1 additional matching characteristic), the zone with the smallest aggregate differences among characteristics, weighting of characteristics, highest qualitative indicator, or some combination thereof can be used to determine the most optimal match.

In another instance, the criteria can be changed to arrive at a different result including on which the matching criteria are looser:

| Zone Matching Criteria | |
|---|---|
| Minimum # of characteristics: | 2 |
| Turf Type: | Yes |
| Soil Type: | Yes |
| Shade: | No |
| Flow Rate: | No |
| Slope Grade: | No |
| ZIP + 4: | Yes |

Here, each of Zones 1, 2, and 3 match Zone A and Zone 3 matches Zone B, despite potentially significant differences in other characteristics. This type of loose matching can use used, for example, in geographic areas where there are fewer zones from which to match. With an increase in the minimum # of characteristics a match would not be found for Zone B.

In yet another instance, fuzzy matching can be implemented by attributing a range to characteristics and where a value falls within the range, a match is found:

| Zone Matching Criteria | | | |
|---|---|---|---|
| Characteristic | Value | Range | Possible Values |
| Minimum # of characteristics: | 4 | n/a | n/a |
| Turf Type: | Yes | ±1 | 1 to 5 |
| Soil Type: | Yes | n/a | 1 to 5 |
| Shade: | Yes | ±1 | 1 to 5 |
| Flow Rate: | Yes | ±1.5 GPM | n/a |
| Slope Grade: | Yes | ±1% | n/a |
| ZIP + 4: | No | n/a | n/a |

Here, even with a higher number of minimum characteristics, the likelihood of a match is increased. In the table above, turf types can range from 1 (more drought resistant) to 5 (less drought resistant); soil types can range from 1 (less porous) to 5 (more porous); and shade can range from 1 (least shade) to 5 (most shade). Flow rate and slope grade ranges can be a range of gallons per minute (or some other ratio) and grade range, respectively.

| Existing Zones | | | | | | | |
|---|---|---|---|---|---|---|---|
| Zone | Qualitative Indicator | Turf Type | Soil Type | Shade | Flow Rate (GPM) | Slope Grade | ZIP + 4 |
| 1 | 5 | 1 | 5 | 4 | 1 | 0% | 80304-0471 |
| 2 | 2 | 2 | 4 | 5 | 6 | 0.5% | 80304-0471 |
| 3 | 4 | 3 | 3 | 1 | 1 | 0% | 80304-0471 |
| 4 | 3 | 5 | 1 | Unknown | 7.5 | 3% | 80304-0471 |
| 5 | 4 | 4 | 2 | 1 | 5 | 2% | 80304-0471 |

| Zones to Match | | | | | | |
|---|---|---|---|---|---|---|
| Zone | Turf Type | Soil Type | Shade | Flow Rate (GPM) | Slope Grade | ZIP + 4 |
| A | 1 | 2 | 5 | 6.5 | 0% | 80304-0471 |
| B | 2 | 1 | 4 | 6 | 1% | 80304-0471 |

Here, Zone A matches Zone 1 on turf type, shade, flow rate and slope grade because the values of the characteristics fall within a matching range of the values for Zone 1. Because four of the characteristics which is equal to the minimum # of characteristic matches, Zones A and 1 match. Those of skill in the art can appreciate that the values of any of the characteristics in the table above or described herein can be grouped in ranges that can vary and be used for matching. Additionally, embodiments can include any of the characteristics described herein to determine a matching zone and can include fewer of the characteristics to determine a matching zone.

In the example above, the shade value for Zone 4 is "unknown." It should be understood that any of the values can be "unknown" in a functional embodiment. In that instance, an "unknown" characteristic can be ignored or be given less weight when determining a match or when adjusting a schedule.

At step 1070, an irrigation schedule for the zone is generated based on an irrigation schedule of the matching zone. In some embodiments, an irrigation schedule identical to the irrigation schedule of the matching zone can be generated. In other embodiments, a baseline irrigation schedule for the matching zone can be used to generate the irrigation schedule. For example, for zone characteristics that do not match, adjustments can be made. For example, where the soil and turf types match but the zone has rotor sprinklers but the matching zone has stationary, the cycle times can be increased. Similarly, where the match was based on the location and turf type, but the shade characteristics for the matching zone indicate lower shade, the cycle times can be reduced. Further, the number of cycles or cycle start times can be adjusted based on characteristics that do not match. Moreover, the irrigation schedule can be adjusted based on the characteristics of the zone independent of the characteristics of the matching zone. For example, shade information for the matching zone can be unknown but shade information for the zone to be scheduled indicates no shade. In that case, the cycle times can be increased by a predetermined amount because of the likelihood that the matching zone includes some shade. Those of skill in the art can appreciate that characteristics of a zone and/or sprinkler can require an increase or decrease in cycle times or number of cycles or adjustments to cycle start times.

As described above, adjustments to a schedule take into account one or more characteristics. Those characteristics include qualitative information about a schedule. For example, a matching zone can have a schedule which has an associated qualitative indicator showing that the landscape is somewhat under-watered. In that case, the schedule can be adjusted to increase cycles or cycle durations. Those of skill in the art can understand that the characteristics of a zone can indicate a preferred adjustment. For example, a zone that has a steeper grade can indicate an adjustment that includes shortening the cycle time and adding a cycle. Where the other zone's schedule indicated under-watering, the cycle time can be increased even further. In embodiments, water schedules can be adjusted according to qualitative measures in addition to quantitative measures rather than just quantitative measures alone. Adjustments can be made according to predetermined values according to characteristic and according to characteristic value. In some embodiments, predetermined adjustment values can be set centrally at central controller 210 or can be change over time according to qualitative indicators or other feedback.

Where a match is determined between zones that have at least some differing factors, it can also be determined whether each differing factor requires an adjustment to a schedule. In some embodiments, program code can loop through each of the differing factors and, for each differing factor, if the factor indicates a downward adjustment to watering cycle frequency or cycle time, such an adjustment is made. For example, the matching zone can have three nozzles with a rotor nozzle type while the zone to be scheduled has three nozzles with a static nozzle type and the flow rates of the two zones are the same or differ only insignificantly. In that case, the cycle time reduction would be indicated to account for the nozzle type. Other factor differences can indicate a further cycle time reduction, a cycle time increase, a cycle frequency decrease, or a cycle frequency increase. Those of ordinary skill in the art can appreciate how the different factors described herein can indicate an increase or decrease in cycle times or cycle frequency. At step 1080, the irrigation schedule data for the zone can be sent to the sprinkler controller.

Figure 11:
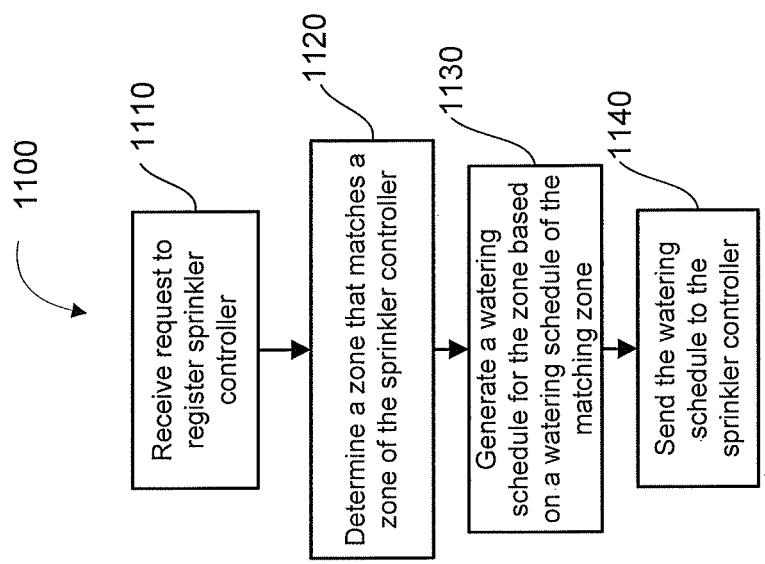

FIG. 11 is a flowchart illustrating a method 1100 for determining and generating an irrigation schedule for a zone of a sprinkler controller in accordance with an embodiment. At step 1110, a request to register a sprinkler controller is received. In this embodiment, one or more zone and/or sprinkler characteristics are received with the request to register the sprinkler controller. At step 1120, a zone that matches a zone of the sprinkler controller is determined. Algorithms for determining a matching zone are described in fuller detail above. As described in more detail above, At step 1130, an irrigation schedule for the zone is generated based on an irrigation schedule for a matching zone. At step 1140, the irrigation schedule for the zone is sent to the sprinkler controller.

Figure 11A:
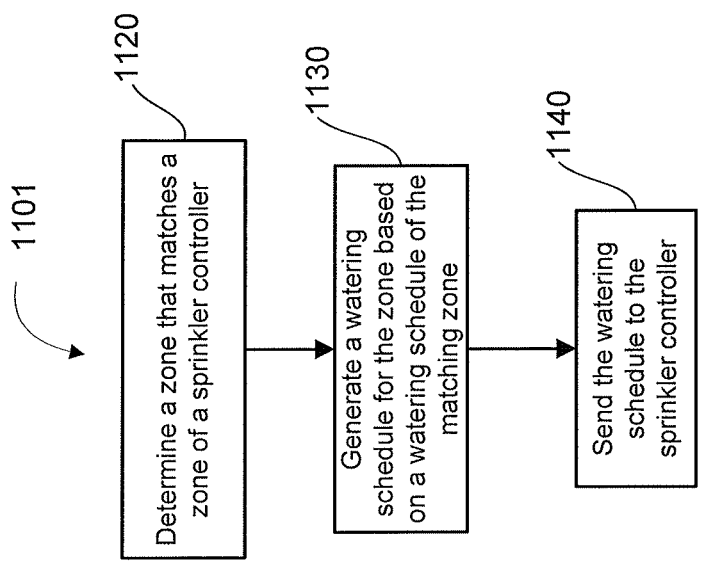

FIG. 11A is a flowchart illustrating a method 1101 for determining and generating an irrigation schedule for a zone of a sprinkler controller in accordance with an embodiment. At step 1120, a zone that matches a zone of a sprinkler controller is determined. At step 1130, an irrigation schedule for the zone is generated based on an irrigation schedule for a matching zone. At step 1140, the irrigation schedule for the zone is sent to the sprinkler controller.

Figure 12:
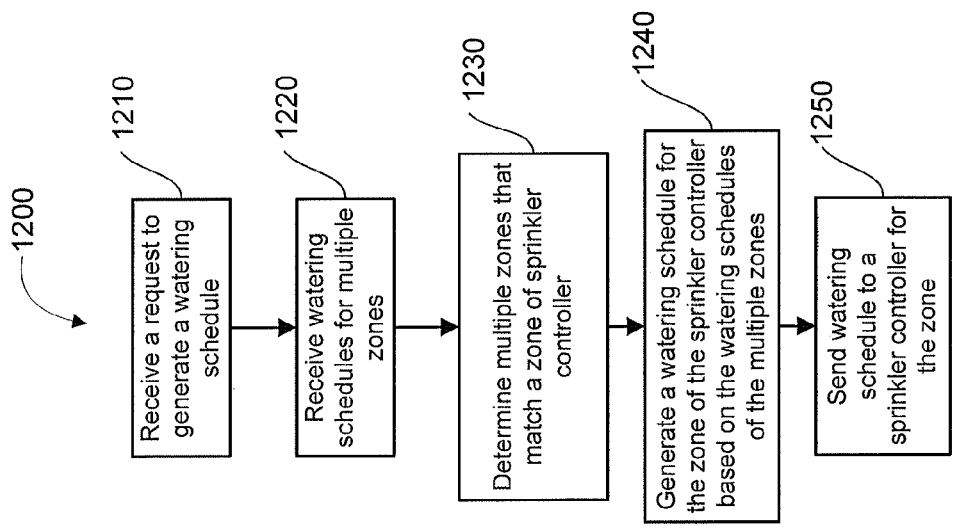
FIGS. 12-16 illustrate method flows for updating irrigation schedule data for a zone of a sprinkler system controller in accordance with some embodiments.

FIG. 12 is a flowchart illustrating a method 1200 for setting an irrigation schedule for a zone of a sprinkler controller based on irrigation schedules for multiple other zones. At step 1210, a request to generate an irrigation schedule is received. The request can originate from a sprinkler controller or some other device on behalf of a sprinkler controller and a zone. It should be understood that a request to update an irrigation schedule can also be received by way of receiving a request to register a sprinkler controller as described above in connection with FIGS. 9-11A. Likewise, it should be understood that setting an irrigation schedule for a zone of a sprinkler controller based on irrigation schedules for multiple other zones as further described below can also apply to the methods described in connection with FIGS. 9-11A.

At step 1220, irrigation schedules for multiple zones are received. In some instances, each irrigation schedule can be associated with a different sprinkler controller. In other instances, multiple irrigation schedules can be associated with the same sprinkler controller. Irrigation schedules can be received by requesting irrigation schedule data from irrigation data 320. In other instances, irrigation schedule data can be received based on a request to one or more sprinkler controllers to send irrigation schedule data. Further, irrigation schedules can be received at different times and stored in irrigation data 320 for later retrieval.

At step 1230, multiple zones that match a zone of the sprinkler controller are determined. The multiple zones are compared against the zone to determine if there is a match. Matches can be determined in the same was as described in connection with FIG. 11. Whether a zone matches can vary in different instances. In some embodiments, a match can depend on a single characteristic of a zone or sprinkler system. In other embodiments, a match can depend on more than one characteristic.

At step 1240, an irrigation schedule for the zone of the sprinkler controller can be generated based on the irrigation schedules of more than one of the multiple zones. In other embodiments, an irrigation schedule can be generated from an irrigation schedule from a single zone of the multiple zones. For example, one of irrigation schedules can have associated qualitative information that indicates the irrigation schedule is optimal or have associated qualitative information that indicates that irrigation schedule is better than other irrigation schedules or would be better suited than other irrigation schedules. A single irrigation schedule can have qualitative information that indicates the landscape is healthy and neither over- or under-watered and the zone shares more characteristics with the first zone than other zones which have associated qualitative information that also indicate a healthy and neither over- nor under-watered landscape. Where two zones both indicate a healthy landscape and share the same characteristics as the first zone or share the same number of characteristics, a determination of which irrigation schedule to generate an irrigation schedule from can be based on weighting of characteristics or some other factor. Other factors can include proximity of the zones to the first zone, recency of the qualitative information, frequency of updates to the qualitative information, and the like.

In other instances, an irrigation schedule can be generated based on an aggregate of two or more of the multiple zones. For example, where three zones match the first zone, an irrigation schedule can be generated by averaging the number of cycles and cycle times of the three zones. In some instances, a number of cycles, cycle start times, or cycle times can be rounded and other factors can be used to set the number of cycles and cycle times. For example, municipalities can promulgate watering restrictions which can take precedence over the number of cycles, the days on which a cycle can be run, or the duration of a cycle. In some instances, default values can be set for some irrigation schedule data where other values are generated from the aggregate. For example, default cycle start times or default cycle days can be used and aggregate cycle times can be determined from the irrigation schedules of the matching zones. At step 1250, the irrigation schedule is sent to the sprinkler controller for the zone.

Figure 13:
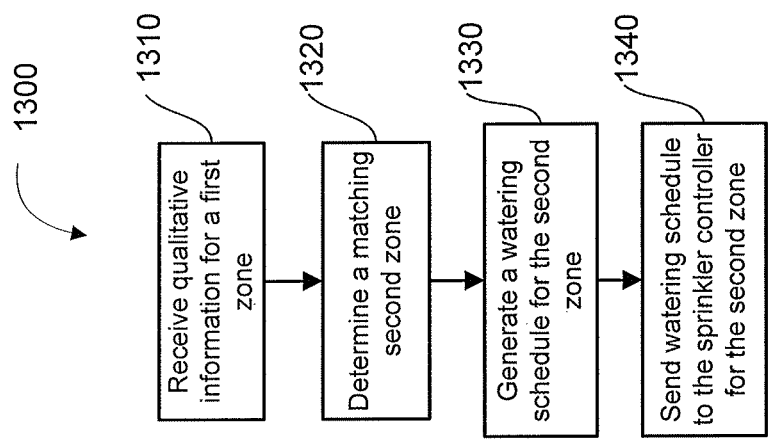

FIG. 13 is a flowchart illustrating a method 1300 for setting an irrigation schedule for a zone of a sprinkler controller based on qualitative information from another zone. At step 1310, qualitative information for a first zone is received. For example, qualitative information about a zone from homeowner can be received indicating that an irrigation schedule is optimal or a landscape is healthy. In response, at step 1320, a matching second zone can be determined. Other zones that are similarly situated to the first zone might benefit from a similar irrigation schedule. Again, matching criteria can vary in different embodiments. At step 1330, an irrigation schedule for the second zone based on an irrigation schedule of the first zone can be generated. In some embodiments, an identical irrigation schedule to the irrigation schedule of the first zone can be generated. In other embodiments, an irrigation schedule can be generated that differs depending on the respective characteristics of the first and second zones. For example, flow characteristics may differ between the sprinkler systems of the zones. Cycle times for the matching second zone can be adjusted up or down accordingly. As described above, other characteristics can be used to determine whether and how to adjust an irrigation schedule from one zone to another. At step 1340, the irrigation schedule for the second zone is sent to the sprinkler controller for the second zone.

Figure 14:
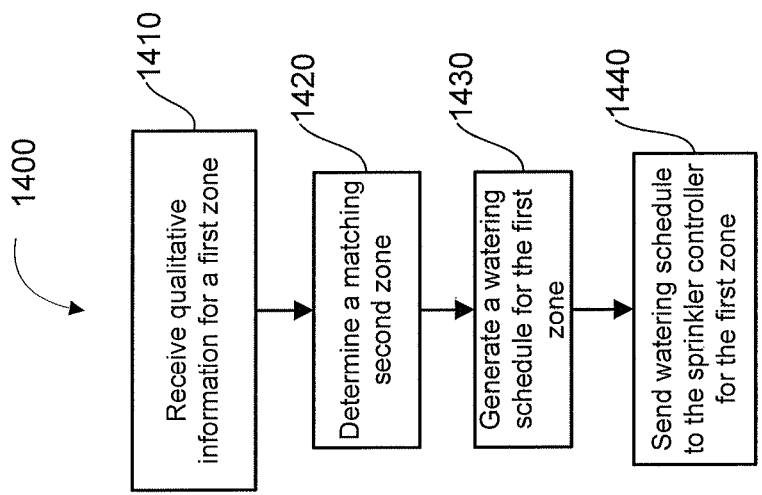

FIG. 14 is a flowchart illustrating a method 1400 for setting an irrigation schedule for a zone of a sprinkler controller based on an optimal irrigation schedule for a similarly situated zone. At step 1410, qualitative information for a first zone is received. For example, qualitative information about a zone from homeowner can be received indicating that an irrigation schedule is suboptimal or a landscape is over-watered or under-watered. In response, at step 1420, a matching second zone can be determined. At step 1430, an irrigation schedule for the first zone based on the irrigation schedule of the second zone can be generated. In some embodiments, an identical irrigation schedule to the irrigation schedule of the second zone can be generated. In other embodiments, an irrigation schedule can be generated that differs depending on the respective characteristics of the first and second zones. For example, flow characteristics may differ between the sprinkler systems of the zones. Cycle times for the matching first zone can be adjusted up or down accordingly. As described above, other characteristics can be used to determine whether and how to adjust an irrigation schedule from one zone to another. At step 1440, the irrigation schedule for the first zone is sent to the sprinkler controller for the first zone.

Figure 15:
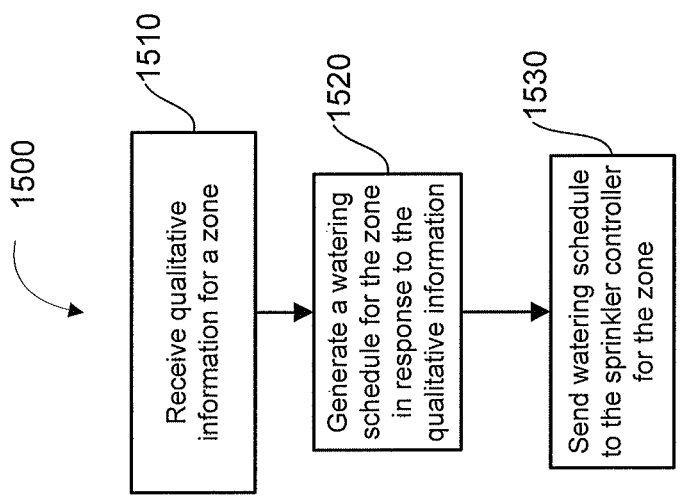

FIG. 15 is a flowchart illustrating a method 1500 for setting an irrigation schedule for a zone of a sprinkler controller based on qualitative information about an existing irrigation schedule. At step 1510, qualitative information for a zone is received. In response, at step 1520, an irrigation schedule for the zone can be generated. Where the qualitative information indicates that the zone is under-watered, cycle times, durations, or both can be increased. The times or durations can be increased at an increment based on a rating associated with the qualitative information. In some embodiments, information from sensors for the zone can be included to determine the increment. Further, in some embodiments, a standard increment can be used to increase cycle times or durations or weather reports and forecasts can be used to the determine whether any change to an existing irrigation schedule should be made, whether a change should be delayed, whether a change should be temporary, or some combination thereof. Where the qualitative information indicates that the zone is over-watered, cycle times, durations, or both can similarly be decreased in the same way as described above in connection with qualitative information indicating a zone is under-watered. At step 1530, the irrigation schedule is sent to the sprinkler controller.

Figure 16:
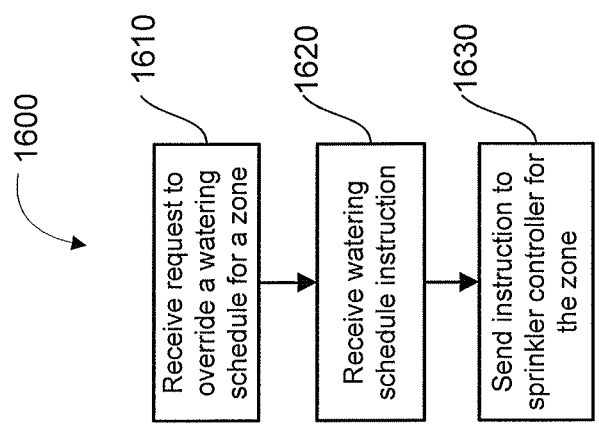

FIG. 16 is a flowchart illustrating a method 1600 for overriding an irrigation schedule in accordance with an embodiment. At step 1610, a request to override an irrigation schedule for a zone is received. In some embodiments, central controller 210 can include a security mechanism to allow a third party to access an irrigation schedule for a zone of sprinkler controller. In some instances, a window of time can be created during which a designated third party can override an irrigation schedule.

Figure 17:
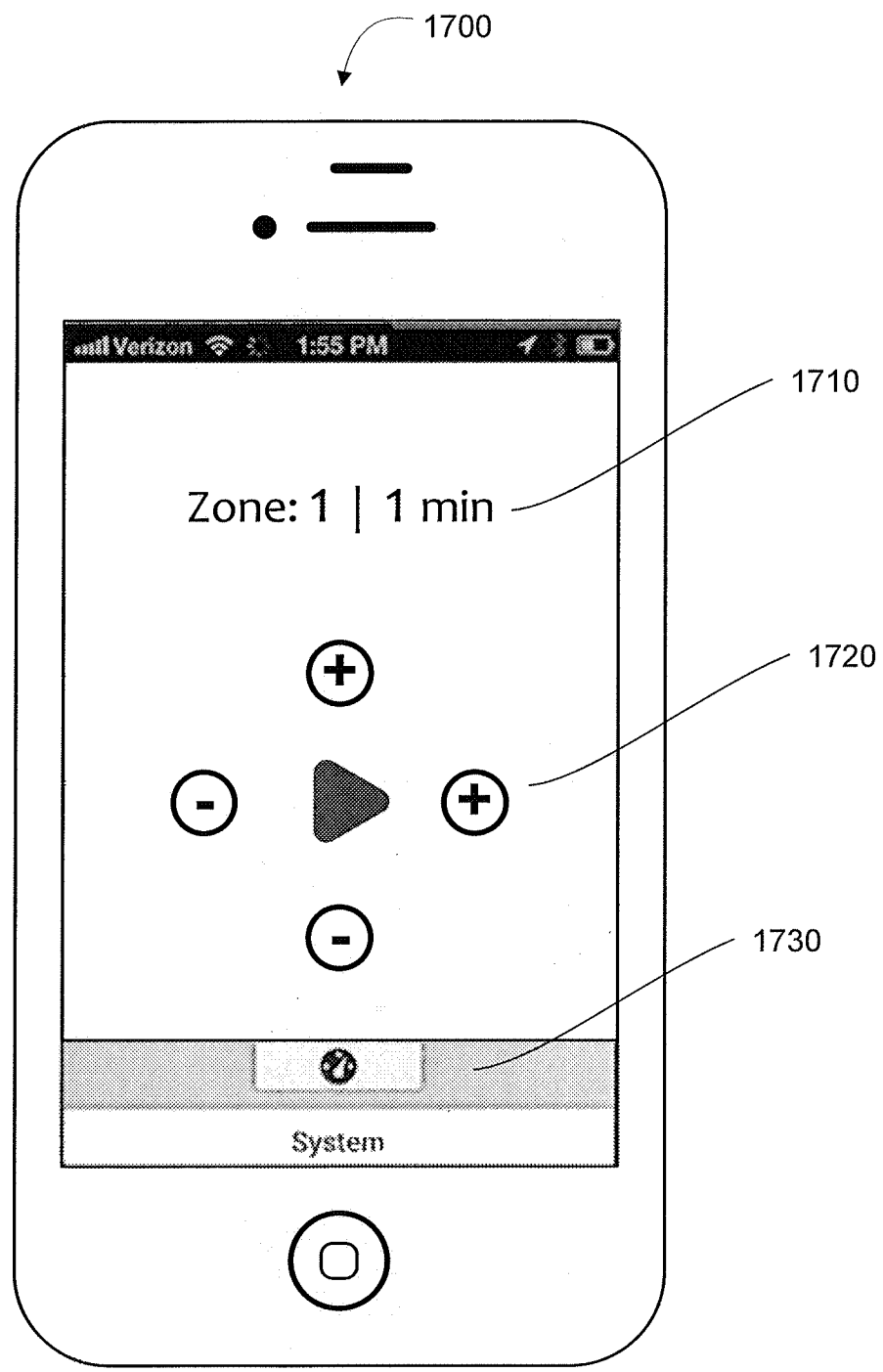
FIGS. 17-23 illustrate a user device for managing irrigation schedule data for a zone of a sprinkler system controller in accordance with some embodiments.

FIG. 17 is an illustration of an interface of an application for managing an irrigation schedule for a zone of a sprinkler controller. The interface of the application is shown on device 1700 which can be any smartphone. Other embodiments can include other types of devices including tablets, laptop computers, desktop computers, other types of personal computing devices, specialized devices such as a handheld device for remotely controlling a sprinkler controller or remotely managing an irrigation schedule, or other computing devices. Application can be hosted on device 260*a-d* or be hosted on a server and accessible via browser. The interface includes a zone cycle time 1710 and controls 1720 for adjusting a cycle time and the zone for which the cycle time is displayed. The interface also includes a system control element 1730 for turning on an individual zone for a specified period of time. Device 1700 can include a transceiver (e.g., radio for cellular communication, Bluetooth, wireless network, etc.) to communicate with sprinkler controller so that zone cycle times can be adjusted and with a central controller so that irrigation data 320 can be updated and then sent to a sprinkler controller.

In some embodiments, an interface, including the interface illustrated in FIG. 17, can be securely shared with an individual other than the sprinkler controller owner for a specified period of time for system operation purposes. For example, the sprinkler controller owner can grant access to the sprinkler controller to a landscape and irrigation professional for a specific window of time and a URL to this type of control could be sent, by a central controller or the sprinkler controller, via email, from which the landscape and irrigation professional could click on the link and access this control for a predetermined period of time.

Figure 18:
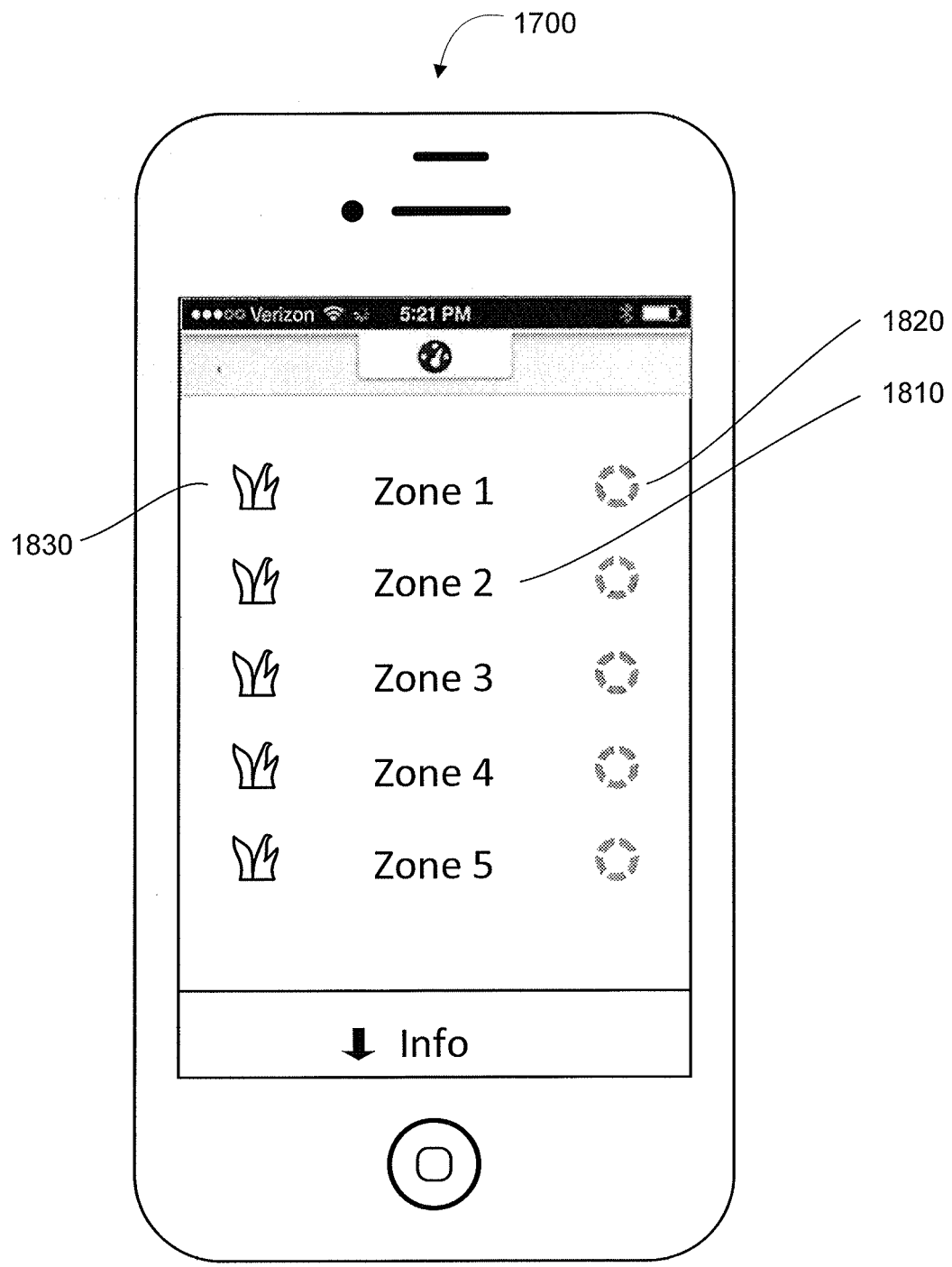

FIG. 18 is an illustration of an interface of an application for managing an irrigation schedule for one or more zones of a sprinkler controller. The interface includes a zone name 1810, its turf or vegetation type (or other zone characteristic indicator) 1830 and indication 1820 if the zone is running at the time of viewing.

Figure 19:
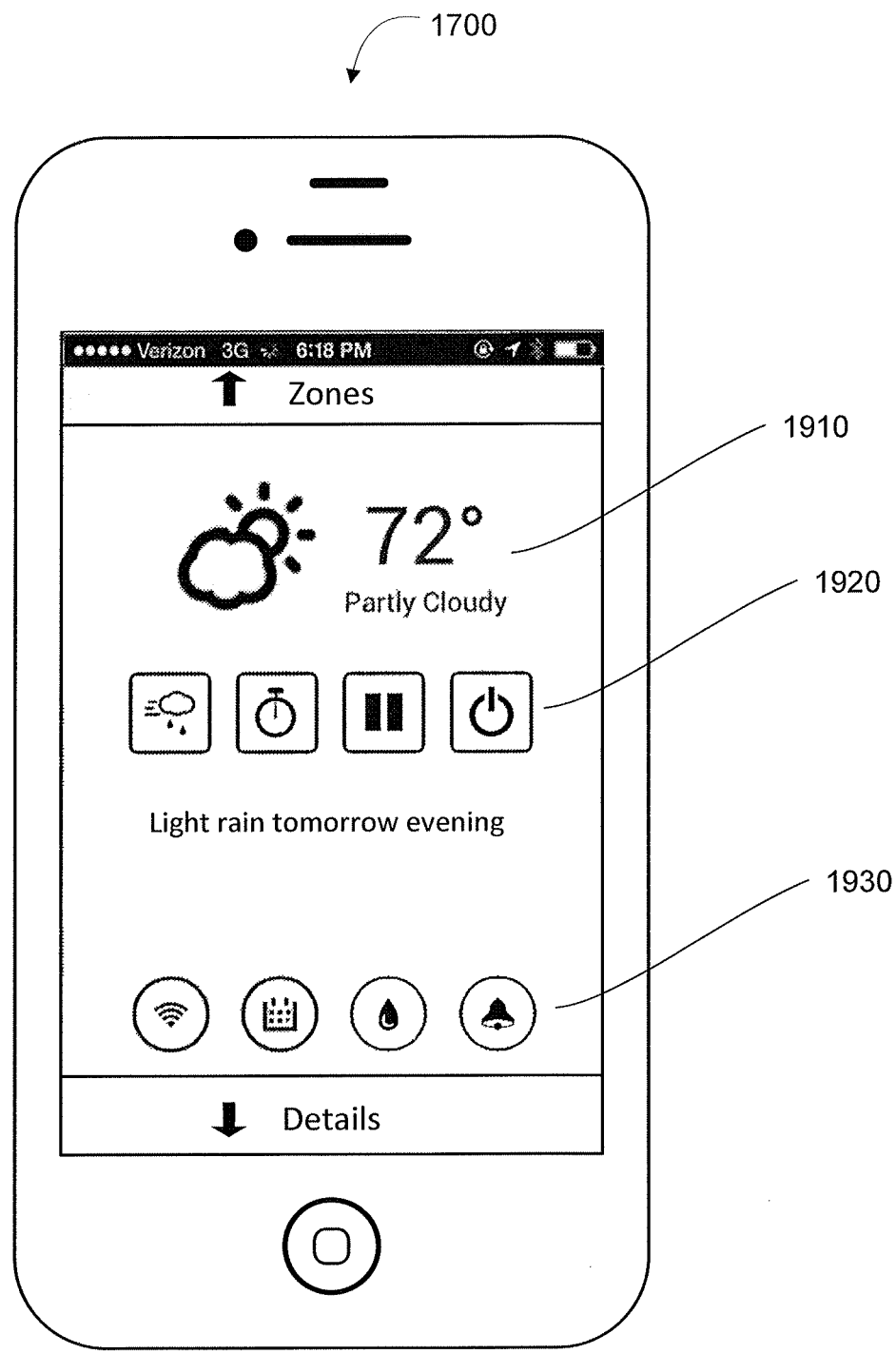

FIG. 19 is an illustration of an interface of an application for managing an irrigation schedule for a zone of a sprinkler controller. The interface includes weather information 1910 which device 1700 can receive via transceiver from data provider 600. The device 1700 can communicate with central controller 210 or directly with data provider 310 to receive weather information 1910. The interface also includes weather controls 1920 including a control for displaying weather information 1910, a control allowing for the update of an irrigation schedule, and controls for overriding an irrigation schedule by pausing or starting a watering cycle. Some embodiments may include further controls or a subset of the controls shown in the embodiment illustrated in FIG. 19. In some embodiments, the interface can allow a user to provide weather feedback which device 1700 can send to a central controller for use in adjusting or overriding irrigation schedules for other zones. Additionally, the interface can include controls 1930 for viewing notifications specific to the sprinkler controller and for running quick schedules, for example, running a quick or ad hoc schedule that would be useful for irrigation maintenance.

Figure 20:
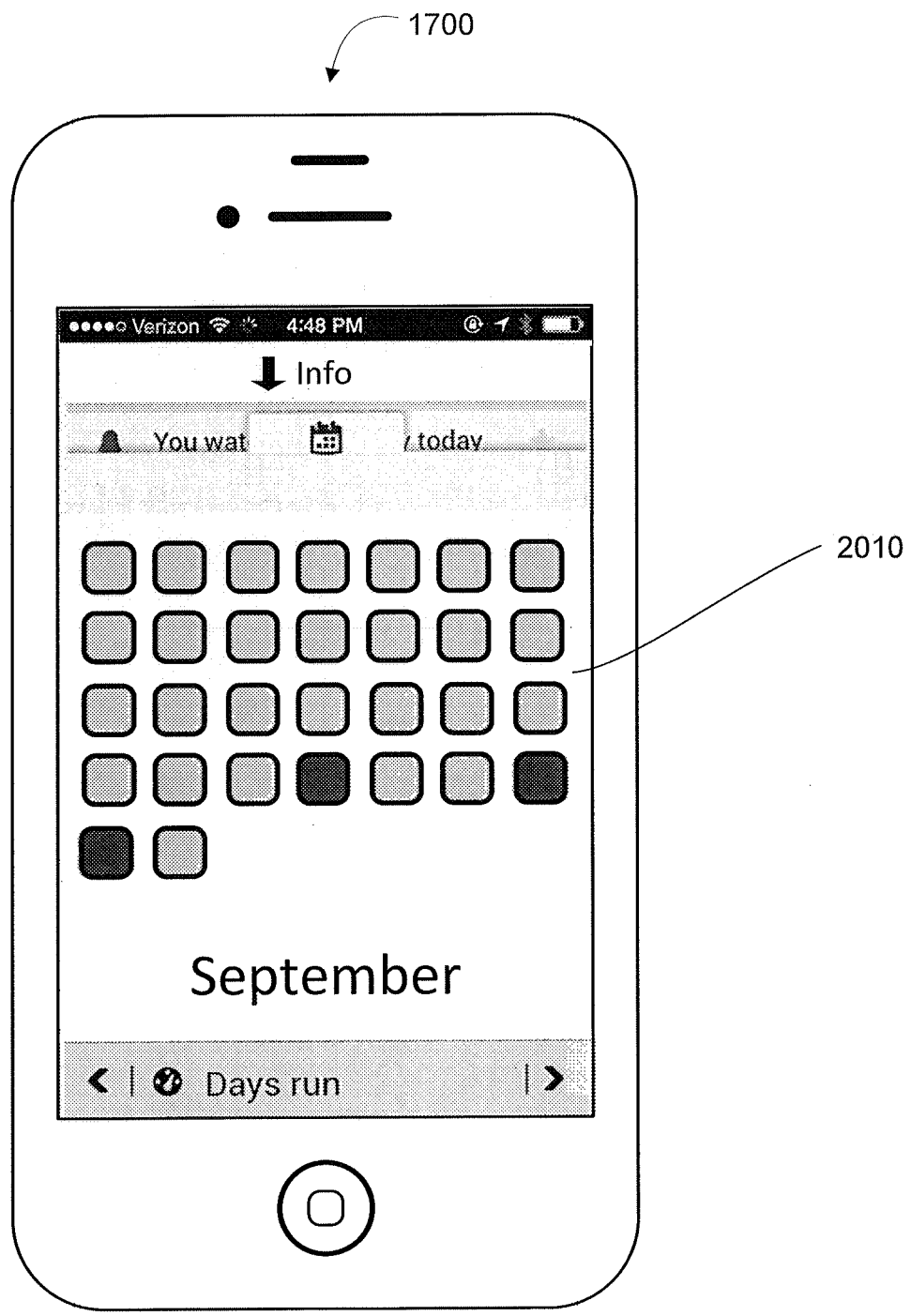

FIG. 20 is an illustration of an interface of an application for managing an irrigation schedule for a zone of a sprinkler controller. The interface includes a schedule or schedule calendar 2010 showing the days that a watering cycle for a zone was run. In the embodiment shown, darker squares indicate a watering cycle was run. It should be understood that other embodiments can represent historic watering cycles in a number of ways and that the particular interface shown is not limiting to how historic watering is represented.

Figure 21:
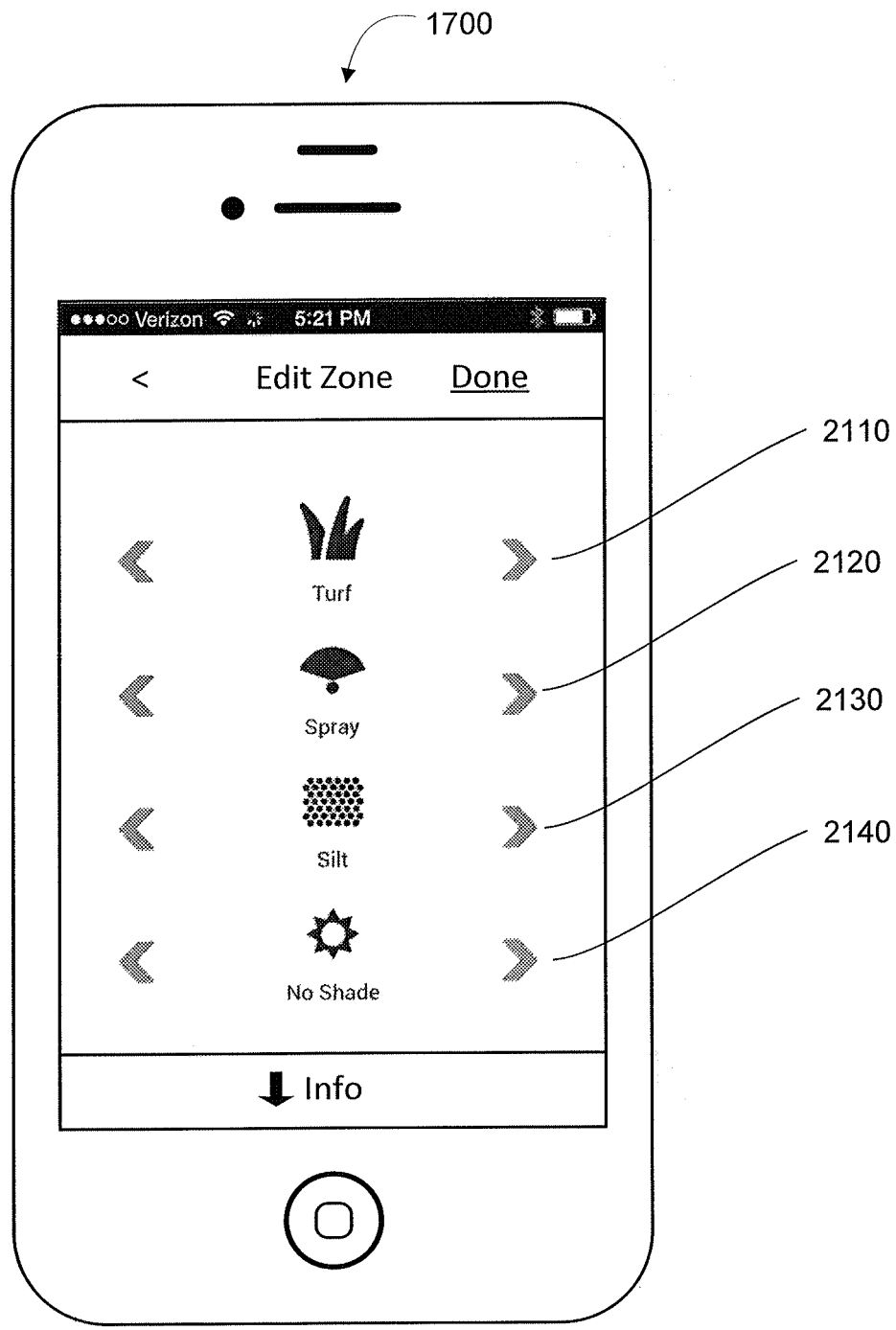

FIG. 21 is an illustration of an interface of an application for managing zone characteristics. The interface includes controls for setting a turf type 2110, the type of sprinkler system 2120, the soil type 2130, the type of shade 2140. The names assigned to the controls can differ in different embodiments. Furthermore, some embodiments may include additional controls for other zone characteristics described herein or a subset of the controls shown in FIG. 21. In the embodiment shown, the controls 2110-2140 include arrows for adjusting the zone characteristics. Again, other embodiments may include other types of adjustment controls.

Figure 22:
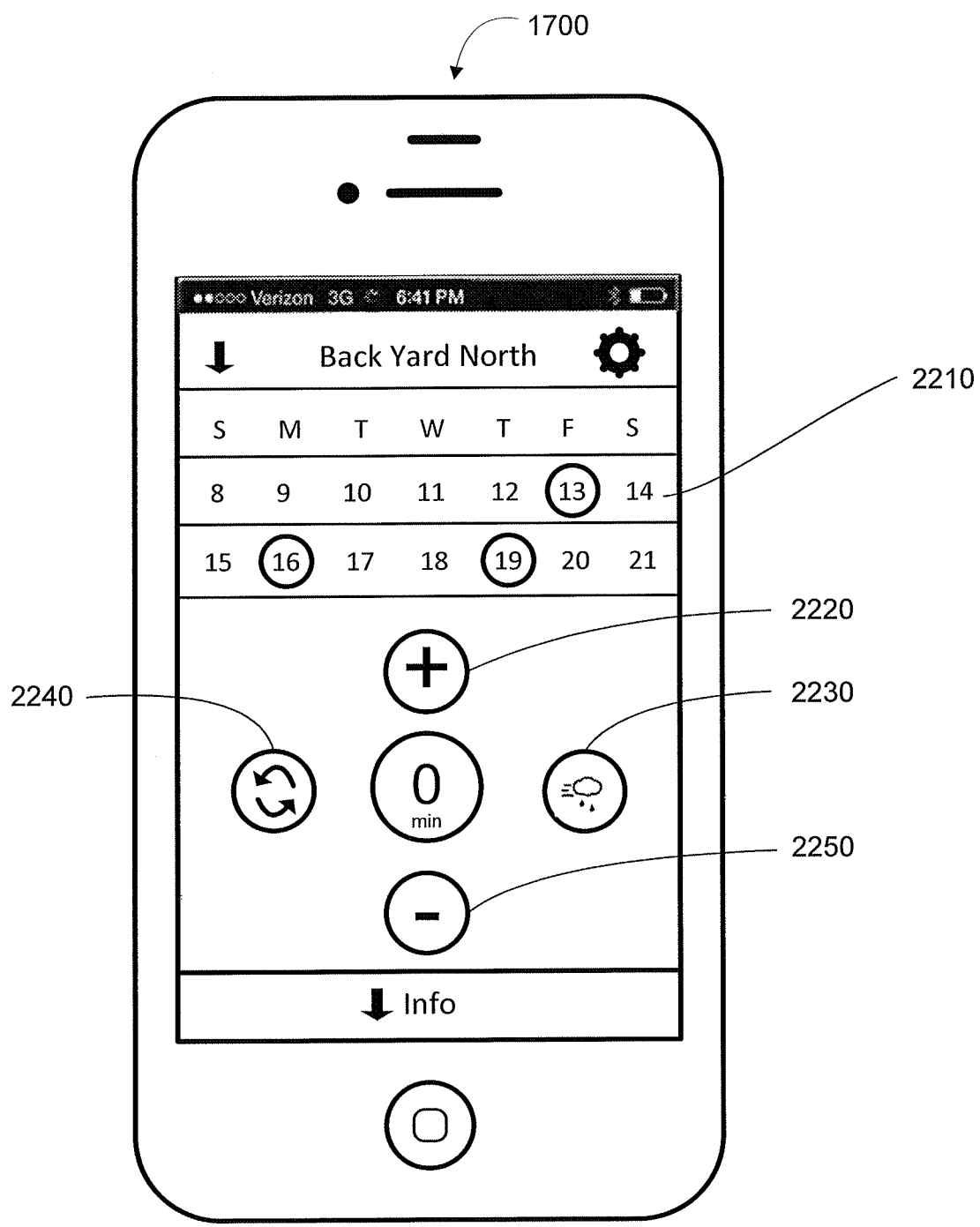

FIG. 22 is an illustration of an interface of an application for managing an irrigation schedule for a zone of a sprinkler controller. The interface includes a calendar portion 2210 and adjustment controls. Calendar portion 2210 includes indicators for the days which a watering cycle is scheduled. In some embodiments, the calendar portion 2210 can be used to set or unset a day on which a watering cycle is run by clicking the day. In other embodiments, calendar portion 2210 can be just a display element. The interface further includes cycle controls including a control for adjusting a cycle time up 2220 or down 2250, a rain delay control 2230, and a control for repeating a cycle 2240. These and other controls can be used on a zone-by-zone basis.

Figure 23:
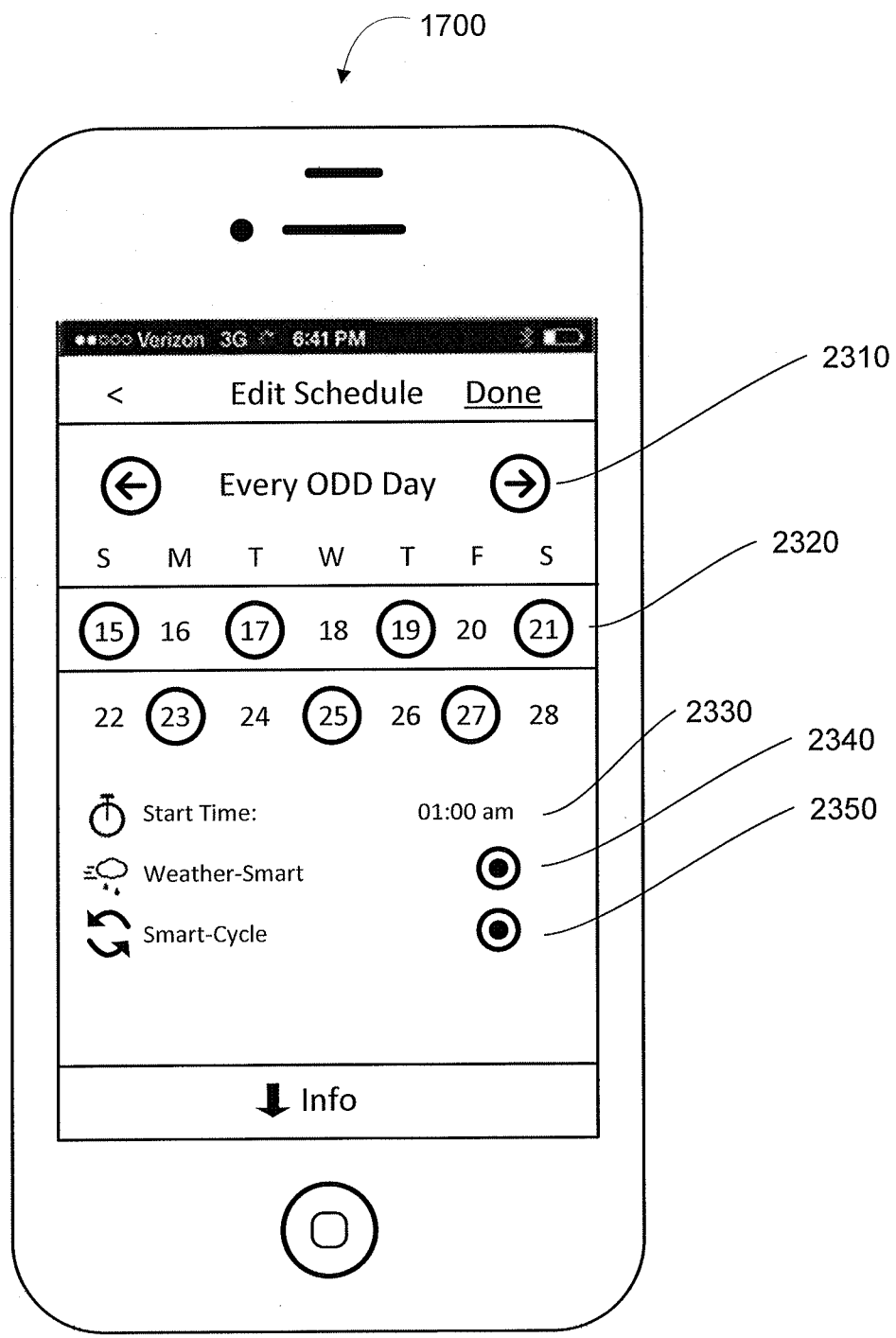

FIG. 23 is an illustration of an interface of an application for managing an irrigation schedule for a zone of a sprinkler controller. The interface includes a default schedule control 2310 and calendar portion 2320. Default schedule control 2310 can be used to set a default schedule. In the illustration of FIG. 23, an "Every ODD Day" default schedule is set in which a watering cycle is set for every odd day. Other default schedules can include every even day, every third day, every Monday, Wednesday, Friday, and the like. Any permutation of day intervals can be used for a default schedule. In some embodiments, default schedules can be customized either at device 1700 and stored on device 1700, in irrigation data 320, or some other data store or customized according to zone or sprinkler characteristics.

Additionally, the interface includes cycle start time information 2330, a weather-smart control 2340, and smart-cycle control 2350. In some embodiments, cycle start time information 2330 can by a display element or can be used to set a start time. Weather-smart control 2340 can be used to override an irrigation schedule based on current and/or forecast weather. For example, where weather data indicates the zone has received rain for three days and a watering cycle is scheduled, the irrigation schedule can be overridden so that the cycle does not run. Smart-cycle control 2350 can be used to communicate an instruction to a sprinkler controller or a central controller to turn on or off customized scheduling. In some embodiments, options for level of customization can be used and stored in irrigation data 320 or other central data store. For example, a level of customization can indicate that an irrigation schedule should be entirely ad hoc based on some combination of information including weather data, qualitative feedback related to landscape health, sensor data, and the like; that an irrigation schedule should be adjusted once or at some predetermined interval (e.g., based on time or on the occurrence of some event such as a request), or some combination thereof. Adjustments can be made based on a baseline schedule or another optimized schedule as described above.

Some embodiments described herein relate to a computer storage product with a non-transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

In conclusion, disclosed embodiments provide, among other things, a system and method for providing integrated playlists and seamless consumption of media. Those skilled in the art can readily recognize that numerous variations and substitutions may be made to the disclosed embodiments, their use and their configuration to achieve substantially the same results as achieved by the embodiments described herein. Accordingly, there is no intention to limit the disclosed embodiments or the claimed inventions to the disclosed exemplary forms. Many variations, modifications and alternative constructions fall within the scope and spirit of the inventions as expressed in the claims.

What is claimed is:

1. A method for programming a sprinkler controller, comprising:
    receiving at least one characteristic record value for a first sprinkler zone associated with a first sprinkler controller and a first irrigation schedule, the first irrigation schedule associated with the first sprinkler zone;
    receiving a computer-readable file including instructions for programming an irrigation schedule for the first sprinkler zone;
    receiving at least one characteristic record value for a second sprinkler zone associated with a second sprinkler controller and a second irrigation schedule, the second sprinkler controller unrelated to the first sprinkler controller and the second irrigation schedule associated with the second sprinkler zone;
    determining that a characteristic record value for the first sprinkler zone matches a characteristic record value for the second sprinkler zone;
    generating a computer-readable file in a memory of computer server, the file including instructions for programming an irrigation schedule for the second sprinkler zone in response to the determining that a characteristic record associated with the first sprinkler zone matches a characteristic record associated with the second sprinkler zone, the second irrigation schedule based at least in part on the first irrigation schedule;
    sending, by a network communication device of the computer server, the second irrigation scheduling data for the second sprinkler zone to the second sprinkler controller.

2. The method of claim 1 wherein at least one characteristic for the second sprinkler zone is a landscape characteristic selected from the group comprising: soil type, vegetation type, turf type, slope value, and shade value.

3. The method of claim 1 wherein the at least one characteristic for the second sprinkler zone is a sprinkler characteristic selected from the group comprising: make of sprinkler nozzle, make of sprinkler valve, model of sprinkler nozzle, model of sprinkler valve, nozzle type, water flow rate, water pressure.

4. The method of claim 1 further comprising:
    receiving a request signal to update the second irrigation schedule for the second sprinkler zone.

5. The method of claim 1 further comprising:
    receiving a qualitative indicator signal for the second sprinkler zone and wherein the second irrigation schedule is determined in response to the receiving the qualitative indicator signal for the second sprinkler zone.

6. The method of claim 1 further comprising:
    receiving a qualitative indicator signal for the first sprinkler zone and wherein the second irrigation schedule is determined in response to the receiving the qualitative indicator signal for the second sprinkler zone.

7. The method of claim 1 further comprising:
    receiving watering restriction data; and wherein the determining the second irrigation schedule includes at least one of omitting a watering day from the schedule based on the restriction information, adding a watering day to the schedule based on the restriction information, and setting a cycle time for at least one watering cycle based on the restriction information.

8. The method of claim 1 wherein determining that the characteristic record value for the first sprinkler zone matches the characteristic record value for the second sprinkler zone includes determining that the characteristic record value for the first sprinkler zone equals the characteristic record value for the second sprinkler zone.

9. The method of claim 1 where determining that the characteristic record value for the first sprinkler zone matches the characteristic record value for the second sprinkler zone includes determining that the characteristic record value for the first sprinkler zone is within a predetermined ranged of the characteristic record value for the second sprinkler zone.

10. A non-transitory, computer readable medium containing instructions comprising
    receiving at least one characteristic record value for a first sprinkler zone associated with a first sprinkler controller and a first irrigation schedule, the first irrigation schedule associated with the first sprinkler zone;
    receiving a computer-readable file including instructions for programming an irrigation schedule for the first sprinkler zone;
    receiving at least one characteristic record value for a second sprinkler zone associated with a second sprinkler controller and a second irrigation schedule, the second sprinkler controller unrelated to the first sprinkler controller and the second irrigation schedule associated with the second sprinkler zone;
    determining that a characteristic record value for the first sprinkler zone matches a characteristic record value for the second sprinkler zone;
    generating a computer-readable file in a memory of computer server, the file including instructions for programming an irrigation schedule for the second sprinkler zone in response to the determining that a characteristic record associated with the first sprinkler zone matches a characteristic record associated with the second sprinkler zone, the second irrigation schedule based at least in part on the first irrigation schedule;

sending, by a network communication device of the computer server, the second irrigation scheduling data for the second sprinkler zone to the second sprinkler controller.

11. The non-transitory, computer-readable medium containing instructions of claim 10 wherein at least one characteristic of the second sprinkler zone is a landscape characteristic selected from the group comprising: soil type, vegetation type, turf type, slope value, and shade value.

12. The non-transitory, computer-readable medium containing instructions of claim 10 wherein at least one characteristic of the second sprinkler zone is a sprinkler characteristic selected from the group comprising: make of sprinkler nozzle, make of sprinkler valve, model of sprinkler nozzle, model of sprinkler valve, nozzle type, water flow rate, water pressure.

13. The non-transitory, computer-readable medium containing instructions of claim 10 further comprising instructions for:
receiving a request signal to update the second irrigation schedule for the second sprinkler zone.

14. The non-transitory, computer-readable medium containing instructions of claim 10 further comprising instructions for:
receiving a qualitative indicator signal for the second sprinkler zone and wherein the second irrigation schedule is determined in response to the receiving the qualitative indicator signal for the second sprinkler zone.

15. The non-transitory, computer-readable medium containing instructions of claim 10 further comprising instructions for:
receiving a qualitative indicator signal for the first sprinkler zone and wherein the second irrigation schedule is determined in response to the receiving the qualitative indicator signal for the second sprinkler zone.

16. The non-transitory, computer-readable medium containing instructions of claim 10 further comprising instructions for:
receiving watering restriction data; and wherein the determining the second irrigation schedule includes at least one of omitting a watering day from the schedule based on the restriction information, adding a watering day to the schedule based on the restriction information, and setting a cycle time for at least one watering cycle based on the restriction information.

17. The non-transitory, computer-readable medium containing instructions of claim 10 wherein determining that the characteristic record value for the first sprinkler zone matches the characteristic record value for the second sprinkler zone includes determining that the characteristic record value for the first sprinkler zone equals the characteristic record value for the second sprinkler zone.

18. The non-transitory, computer-readable medium containing instructions of claim 10 where determining that the characteristic record value for the first sprinkler zone matches the characteristic record value for the second sprinkler zone includes determining that the characteristic record value for the first sprinkler zone is within a predetermined ranged of the characteristic record value for the second sprinkler zone.

* * * * *